United States Patent
Eichhorn et al.

(10) Patent No.: US 10,414,137 B2
(45) Date of Patent: Sep. 17, 2019

(54) LIGHTWEIGHT, INSULATED, WEATHER-RESISTANT, BUILDING PRODUCTS, METHODS AND STRUCTURES USING THE SAME

(71) Applicant: RHINO BUILDING PRODUCTS, Rose Bud, AR (US)

(72) Inventors: Scott W. Eichhorn, Rose Bud, AR (US); Elton D. Culwell, Rose Bud, AR (US); Daniel L. Culwell, Rose Bud, AR (US); Timothy L. Culwell, Rose Bud, AR (US)

(73) Assignee: RHINO BUILDING PRODUCTS, Rose Bud, AR (US)

( * ) Notice: Subject to any disclaimer, the term of this patent is extended or adjusted under 35 U.S.C. 154(b) by 0 days.

(21) Appl. No.: 15/413,399

(22) Filed: Jan. 23, 2017

(65) Prior Publication Data
US 2017/0211268 A1    Jul. 27, 2017

Related U.S. Application Data

(60) Provisional application No. 62/286,002, filed on Jan. 22, 2016.

(51) Int. Cl.
*B32B 27/30* (2006.01)
*A01M 31/02* (2006.01)
(Continued)

(52) U.S. Cl.
CPC ............ *B32B 27/302* (2013.01); *A01K 1/033* (2013.01); *A01M 31/02* (2013.01); *B32B 3/08* (2013.01);
(Continued)

(58) Field of Classification Search
CPC ... B62B 15/00; B62B 15/007; B62B 2202/42; B63B 35/73
(Continued)

(56) References Cited

U.S. PATENT DOCUMENTS

| 4,571,195 | A | * | 2/1986 | Brooks, Jr. | ........... | B63B 35/811 |
| | | | | | | 280/14.21 |
| 4,678,445 | A | * | 7/1987 | Monreal | ................ | A63C 5/031 |
| | | | | | | 280/18 |

(Continued)

OTHER PUBLICATIONS

All Seasons Feeders—On Line Collections—Aug. 2015—https://www.allseasonsfeeders.com/collections/deerblinds/products/little-chingon?variant=11247679430.
(Continued)

*Primary Examiner* — Jeffrey J Restifo
(74) *Attorney, Agent, or Firm* — Robert W. Morris; Eckert Seamans Cherin & Mellott, LLC

(57) ABSTRACT

Insulated building products, methods and structure using those products are disclosed. The embodiments described include building materials having a core of encapsulated polystyrene (EPS) which is completely coated with a polymer. The polymer coating provides protection and structural integrity to the foam such that structures made of EPS foam can support multiple human beings without incurring damage. Moreover, additional embodiments are provided in which additional structural integrity is provided by affixing one or more rigid materials to the EPS foam prior to coating. The results, as disclosed, are light-weight, portable building structures that provide protection from the weather and that can be easily heated or cooled.

14 Claims, 21 Drawing Sheets

(51) Int. Cl.
*A01K 1/03* (2006.01)
*B32B 5/18* (2006.01)
*B32B 27/08* (2006.01)
*B62B 15/00* (2006.01)
*E04B 1/343* (2006.01)
*E04H 15/00* (2006.01)
*B32B 5/32* (2006.01)
*B32B 7/12* (2006.01)
*B32B 21/04* (2006.01)
*B32B 21/14* (2006.01)
*B32B 27/06* (2006.01)
*B32B 3/08* (2006.01)
*B32B 3/10* (2006.01)
*E04C 2/24* (2006.01)

(52) U.S. Cl.
CPC .............. *B32B 3/10* (2013.01); *B32B 5/18* (2013.01); *B32B 5/32* (2013.01); *B32B 7/12* (2013.01); *B32B 21/047* (2013.01); *B32B 21/14* (2013.01); *B32B 27/065* (2013.01); *B32B 27/08* (2013.01); *B62B 15/007* (2013.01); *E04B 1/34321* (2013.01); *E04C 2/243* (2013.01); *E04C 2/246* (2013.01); *E04H 15/001* (2013.01); *B32B 2250/02* (2013.01); *B32B 2250/03* (2013.01); *B32B 2250/22* (2013.01); *B32B 2250/40* (2013.01); *B32B 2255/08* (2013.01); *B32B 2255/10* (2013.01); *B32B 2255/102* (2013.01); *B32B 2255/26* (2013.01); *B32B 2266/0228* (2013.01); *B32B 2266/08* (2013.01); *B32B 2307/304* (2013.01); *B32B 2307/712* (2013.01); *B32B 2307/718* (2013.01); *B32B 2419/06* (2013.01); *B32B 2607/00* (2013.01)

(58) Field of Classification Search
USPC ............. 280/18, 18.1, 19.1, 19, 20; 114/351
See application file for complete search history.

(56) References Cited

U.S. PATENT DOCUMENTS

| | | | | |
|---|---|---|---|---|
| 4,825,799 A * | 5/1989 | Bergeron | ................... | B63B 7/04 114/125 |
| 4,850,913 A * | 7/1989 | Szabad, Jr. | ............... | A63C 5/12 441/65 |
| 4,887,823 A * | 12/1989 | Hallett | ................... | A01M 31/00 280/19 |
| 4,894,034 A * | 1/1990 | Brown, III | .......... | B63B 35/7906 280/18.1 |
| 4,909,524 A * | 3/1990 | Paine | ....................... | B25H 5/00 2/46 |
| 4,968,046 A * | 11/1990 | O'Connell | .............. | B62B 15/00 114/43 |
| D317,194 S * | 5/1991 | Brocone | ....................... | D21/769 |
| 5,253,885 A * | 10/1993 | McCracken | ............ | B62B 15/00 280/19 |
| 5,275,860 A * | 1/1994 | D'Luzansky | ......... | B29C 44/129 114/357 |
| 5,306,026 A * | 4/1994 | Jesse | ....................... | B62B 15/00 280/18 |
| 5,540,179 A * | 7/1996 | Mayfield | ................. | B63B 35/74 114/362 |
| 5,597,277 A * | 1/1997 | Mayfield | ................. | B63B 35/44 114/344 |
| 5,653,455 A * | 8/1997 | Richards | ................. | B62B 5/068 280/1.5 |
| 5,687,977 A * | 11/1997 | Smith | ..................... | B62B 13/12 280/16 |
| 5,709,477 A * | 1/1998 | Schinasi | ................... | B65F 1/00 383/4 |
| 5,730,080 A * | 3/1998 | Cripe | ..................... | B63B 35/00 114/344 |
| 5,810,376 A * | 9/1998 | Matheny | ............... | A63C 17/004 280/87.021 |
| 5,868,405 A * | 2/1999 | Lavecchia | ................ | A63C 5/03 280/14.21 |
| 5,887,539 A * | 3/1999 | Rex | ........................ | A01M 31/00 114/351 |
| 5,941,540 A * | 8/1999 | O'Haire | ................... | A63C 5/03 280/18 |
| 6,017,043 A * | 1/2000 | Bennett | ................... | B62B 15/00 280/18 |
| 6,276,698 B1 * | 8/2001 | Calandra | ................. | B62B 15/00 280/18 |
| 6,565,101 B2 * | 5/2003 | Jones, Jr. | ................ | B62B 15/00 280/19 |
| 6,641,446 B1 * | 11/2003 | Bentley | ................... | B62B 13/06 280/19 |
| 6,746,028 B2 * | 6/2004 | Barbee | .................... | B62B 15/00 280/18 |
| 6,880,834 B2 * | 4/2005 | Fitzgerald | ............... | B62B 13/08 188/8 |
| 6,926,293 B1 * | 8/2005 | Pope | ..................... | B62B 5/0083 280/19 |
| 6,988,920 B2 * | 1/2006 | Yeh | .......................... | A63C 5/03 441/65 |
| 7,083,173 B2 * | 8/2006 | Lehr | ...................... | B62B 15/00 280/18 |
| 7,086,654 B2 * | 8/2006 | Sellers | .................... | B62B 13/14 280/18 |
| 7,128,628 B2 * | 10/2006 | Yeh | .......................... | B32B 3/30 441/65 |
| 7,284,762 B2 * | 10/2007 | Mehtonen | ............... | B62B 5/085 280/12.1 |
| 7,422,220 B2 * | 9/2008 | Walkingshaw | ........ | A61G 1/007 224/156 |
| 7,503,568 B2 * | 3/2009 | Mehrmann | ............. | B62B 13/06 280/18 |
| 7,547,024 B1 * | 6/2009 | Dell | ..................... | A01M 31/006 119/725 |
| 7,631,883 B2 * | 12/2009 | Shen | ...................... | A44B 19/26 280/18 |
| 7,654,877 B2 * | 2/2010 | Yeh | ....................... | B29C 70/086 441/65 |
| 7,810,820 B2 * | 10/2010 | Wolf | ........................ | A61G 1/01 280/18 |
| 8,292,683 B2 * | 10/2012 | Axtell | ..................... | B63B 35/73 114/351 |
| 8,757,638 B2 * | 6/2014 | Proch | ..................... | B62B 15/007 224/921 |
| 8,898,839 B2 * | 12/2014 | Kenalty | ................. | A61G 1/044 224/158 |
| 8,936,253 B1 * | 1/2015 | Rizzi | ..................... | A61G 1/013 280/17 |
| 8,955,892 B1 * | 2/2015 | Shumate | ............... | B62B 15/007 280/19 |
| 9,834,286 B2 * | 12/2017 | Rubey | ..................... | B63B 35/73 |
| 2010/0273372 A1 * | 10/2010 | Parsia | .................... | B63B 35/79 441/74 |

OTHER PUBLICATIONS

All Season Feeders—Advertising Video—You Tube—Sep. 2015—"ASF Deer Blind—The last blind you will ever have to buy?"—https://www.youtube.com/watch?v=xFppXDkbZUU&list=PLv9UWDvFsheX6kTa05Gelpvlikxnw-2kv.

All Seasons Feeders—Advertisement—Nov. 2015—Lone Star Outdoor News—Game Warden Blotter, p. 12.

* cited by examiner

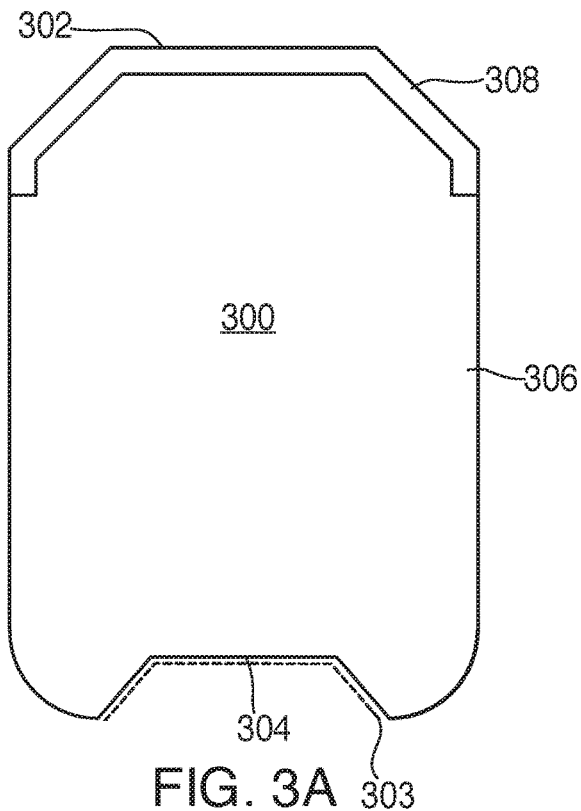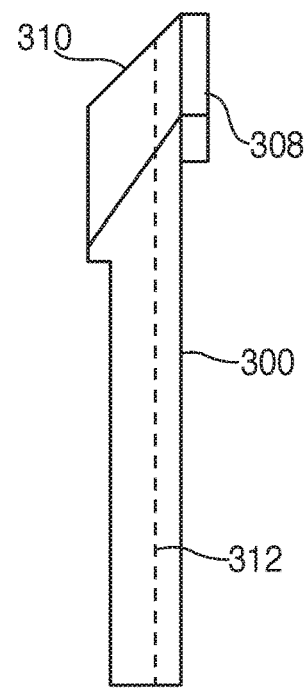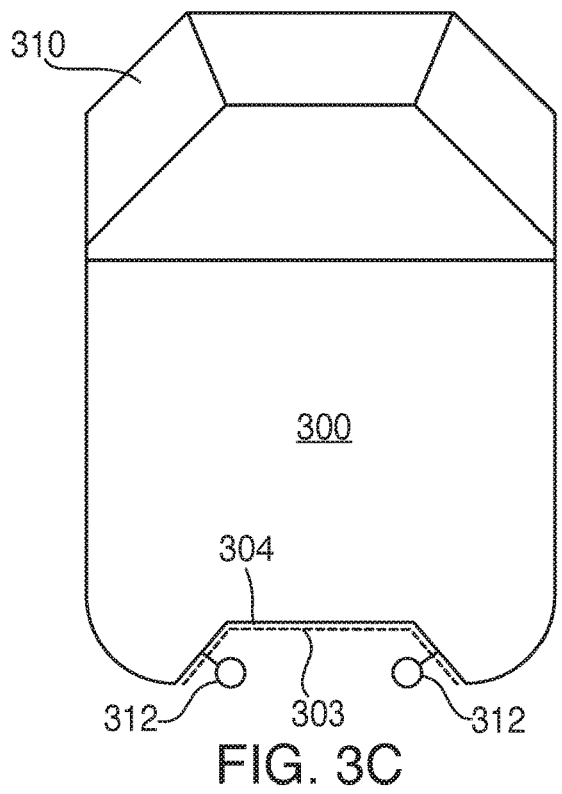

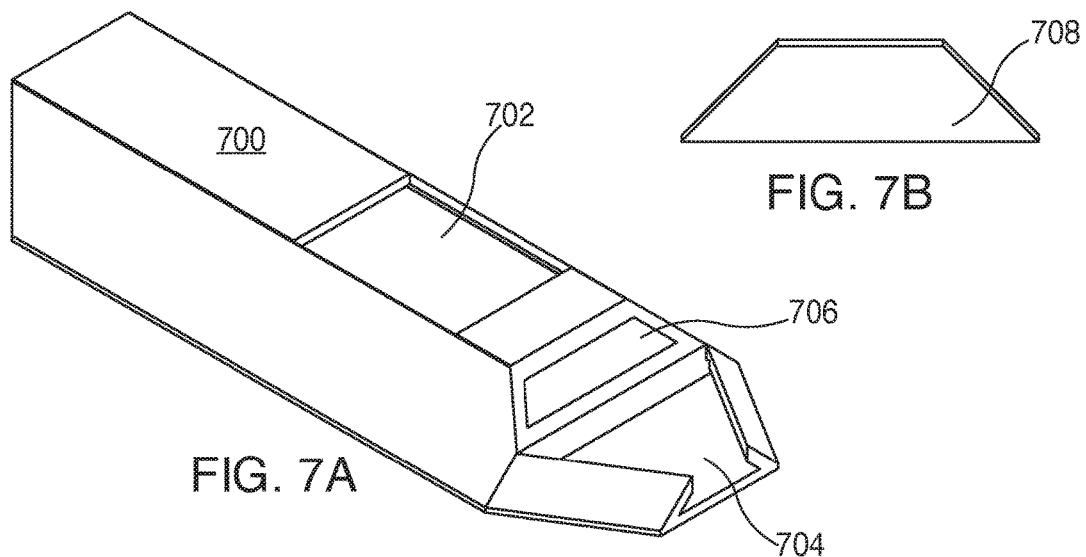
FIG. 7A
FIG. 7B
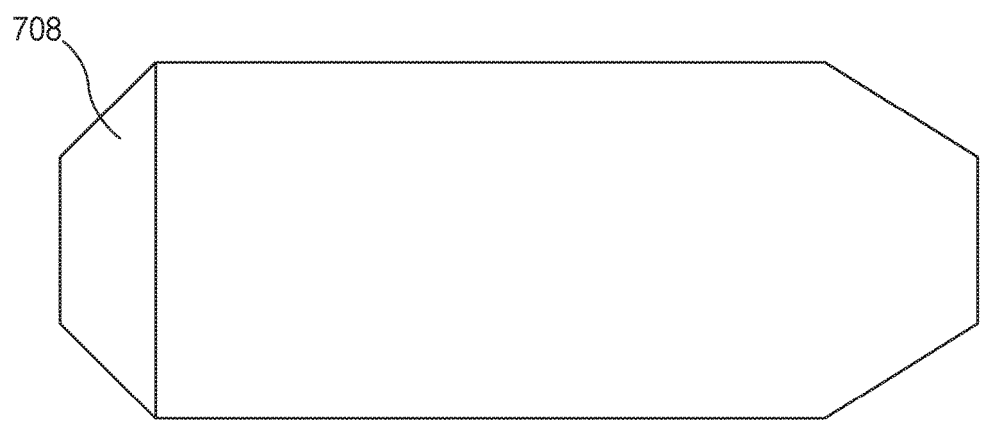
FIG. 7C
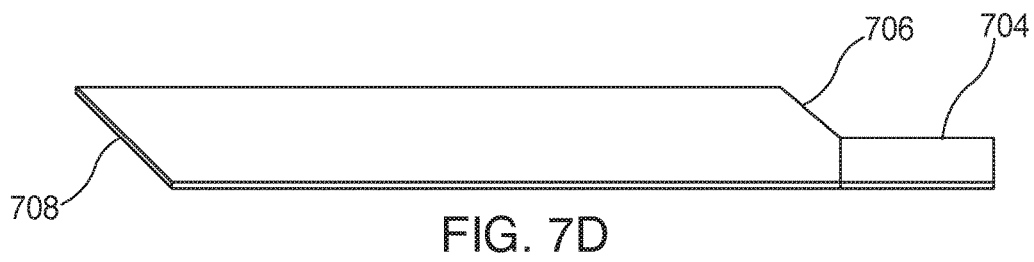
FIG. 7D

LIGHTWEIGHT, INSULATED, WEATHER-RESISTANT, BUILDING PRODUCTS, METHODS AND STRUCTURES USING THE SAME

CROSS-REFERENCE TO RELATED-APPLICATION

This application claims the benefit of U.S. Provisional Patent Application No. 62/286,002, filed on Jan. 22, 2016, the disclosure of which is incorporated herein by reference in its entirety.

FIELD OF THE INVENTION

This disclosure generally relates to lightweight, insulated, weather-resistant, building materials, including methods of manufacturing those materials, and building structures formed using such materials.

BACKGROUND OF THE INVENTION

Traditional building materials are designed for building permanent, fixed structures, such as brick and mortar buildings in which insulation may be placed between two-by-fours, bricks are used to cover the exterior of the two-by-fours, and drywall is used to cover the interior surface. In that manner, the bricks act to protect the interior from the elements, which the insulation is utilized to help maintain the temperature of the interior.

In other instances, where portable building structures may be needed, such as for outdoor activities including hunting and fishing, structures used to protect individuals from the elements are often lacking in capability to do just that. For example, sometime hunters use blinds that are simply tents that have been designed or modified for hunting. In other instances, where a blind may be built of wood or fabric and raised off the surface of the ground on a metal support structure, the wood/fabric may improve the wind-breaking capability, but does little in the way of insulating the interior from changing temperatures. In addition, such structures are difficult to install and/or move due, at least in part, to the overall weight and size of the structure. Moreover, such structures can be damaged by wildlife, such as rodents chewing open holes in the structure, which can lead to rotting and worse. And structures made of such conventional materials can be difficult to clean and/or maintain, such as the negative effects of dirt, moisture, oils, other adverse substances, etc., may get absorbed within the structural material itself. This may require complete replacement of the structures when maintenance fails over time.

SUMMARY OF THE INVENTION

Accordingly, it is an objective of the present disclosure to provide improved building materials that are lightweight, structurally sound, insulating, and/or weather resistant.

It is also an object of the present disclosure to provide lightweight, stable structures that are resistant to the elements, can be heated or cooled to comfortable temperatures with relatively little external heat or cooling.

In one exemplary embodiment, building materials are formed into a structure using a core of expanded polystyrene (EPS) foam (Styrofoam) that is completely coated with a polymer material such as polyurethane. The polyurethane coating can be formed by simultaneously applying a material such as an isocyanate with an alcohol-based material, such as a resin. This application results in a polymer film that is impervious to weather and which increases the structural capacity of the EPS foam. In some embodiments, anchoring material can be affixed to various locations on the Styrofoam prior to coating. The anchoring material can then be used to attach additional structural elements to the building structure, such as a door and/or windows.

In another exemplary embodiment, building structures can be completely assembled from EPS foam to form the core of the structure. The complete structure can then be coated with a polymer coating that completely seals the EPS foam, such that none of the EPS foam is otherwise accessible without destroying at least a portion of the polymer coating. The resultant combined structure will be significantly stronger than the initial EPS structure, and the combined structure can provide insulation with respect to the cold or heat at varying levels depending on the number of openings in the design. In addition, the completely coated structure will be both weather resistant and easy to maintain and clean at least because the coated polymer material can be water-resistant and/or waterproof.

In some exemplary embodiments, building structures can be completely assembled from EPS foam and additional materials can be selectively applied prior to the application of the polymer coating to provide further structural stability and resistance to damage while enabling other structures to be attached to the building structure and/or to provide additional stability to the building structure. For example, a deer stand can be completely formed from EPS foam. Then, prior to the application of polymer coating, a rigid material such as plywood or a laminate such as Formica or similar material can be applied to a portion of the structure, such as the interior floor surface. Once the rigid material(s) have been put in place and secured as necessary with, for example, an adhesive, the polymer coating can be applied to cover the EPS foam and the rigid material.

The rigid material can further reduce the potential of damage to the structure, such as, for example, damage that might otherwise be caused by chairs sliding across the floor of the structure beyond the protection provided by the polymer material alone. In such circumstances, it may be preferable for the rigid material to be a plastic-based material to reduce the likelihood that any moisture could be retained prior to polymer coating which may have the potential to cause the building structure and rigid material to separate. Moreover, the rigid floor structure could also be used to provide a structurally sound material to attach the deer stand to a supporting structure, such as a metal stand used to elevate the deer stand. In some of these embodiments, it may be preferred to utilize rigid material to the roof in addition to or instead of the floor, to prevent falling objects from puncturing or damaging the roof. In other embodiments, the polymer coating can be applied in a sufficiently thick layer that the underlying EPS foam is adequately protected from incidental damage. In those cases, the thickness of the polymer coating on a given building structure can vary depending on which part of the building structure it is being applied to so that the appropriate level of rigidity and structural integrity is maintained. For example, the floor surface may have a polymer coating thickness of 40-60 mils while the walls and exterior surfaces may only need a thickness of 30-50 mils.

In several different embodiments, the EPS foam can be formed into a variety of different building structures prior to the encapsulation coating being applied. For example, the EPS foam can be formed into building structures such as a deer stand, a duck blind, an ice fishing shack, animal houses such as a dog house or a cat house, etc. In these embodiments, the EPS foam can be formed into the appropriate building structures using multiple different pieces of EPS foam that affixed to each other using adhesive, to form a complete structure prior to the application of coating.

In other different embodiments, the EPS foam can be formed into structures that can have a variety of applications that can benefit from the improved structural integrity, light weight, weather resistance, and/or insulating capabilities. For example, such structures can include a layout boat for duck hunting that protects the hunter from the water while providing a location on the boat for a hunting dog; drum racks to hold one or more oil drums; portable steps that can be used for entry to mobile homes; RVs and campers, hazardous containment pads that can be used, for example, for repairing vehicles such as cars, trains or trucks which contain potentially hazardous or damaging liquid materials, such as oils, gasoline and such; berm boarders that can be utilized to maintain containment areas that function in a manner similar to containment pads, but can be significantly larger—berm boarders can be placed around the perimeter of the containment area and covered with a single sheet of protective material which can be secured to the berm boarders by inserting one or more rods in a channel in the berm that secures the protective sheet to the berm; security barricades that can function in the same manner as traditional police saw horses, but that can be lighter, easier to transport and employ, are weather resistant, and can be easily cleaned and maintained; oil drum containment/securing lids that can be used to secure individual oil drums to a pallet or transport truck even though the oil drums have round/circular surfaces; dog blinds that can be used to provide cover to the hunting dog during duck hunting while also providing the dog with protection from the elements; rescue sleds that can be used to help transport injured or incapacitated individuals such as skiers, etc., as the polymer-coated sled can be easily transported over snow or ice while also being completely buoyant for use in rescues on water; tables for use in the water, such as on a lake or in a swimming pool, etc.

In additional embodiments, the insulating advantages of the structures described above, including the EPS foam and the encapsulating polymer material, can be utilized to provide heating and cooling that is essentially magnified beyond that which would ordinarily be expected from a given heat or cooling source. For example, at least some of the exemplary deer blinds described above can be modified to provide a substantial increase in temperature within the deer blind from a heat source as small as a can of Sterno (the traditional heat source utilized with chaffing dishes). In such embodiments, a bench surface within the deer blind (or, for example, the ice shack embodiment), can be provided with one or more heat transfer conduits that are essentially holes within the bench that enable the heat from the heat source to be transmitted directly to the individual rather than being transmitted indirectly to warm the entire interior of the deer stand.

In other additional embodiments, substantial cooling may be provided from a cooling source such as a bag of ice that can be utilized to significantly reduce temperature within a deer stand. In this case, a separate "air conditioning" unit formed from the same EPS core and encapsulating polymer coating, where the unit is provided with an air input port and an air outlet port. The air outlet port can be provided with an electrically driven fan to pull air through the unit. Within the interior of the unit, ledge portions are provided that can be used to secure a V-shaped piece of thermally conductive material, such as metal. The V-shaped material should be configured such that the lower portion of the V extends close to, but does not touch the bottom interior surface, such as being located within approximately 1-2 inches of the bottom surface. A small portion of ice can be placed in the bottom section prior to the V-shaped material being put in place (is may be advantageous for the bottom of the V to be close to, but not touch the ice in the bottom section). After placing the V-shaped material in place, the inside of the V can be filled with ice that will act to further cool the thermally conductive material. Once the lid is closed and the fan is turned on, air will be pulled across the exterior surfaces of the V-shaped material that will substantially cool that air. The larger the V, the more cooling transfer that will occur, as the air is placed in contact with the thermally conductive material for an extended period of time.

In still other exemplary alternate embodiments of the previously described structures, the EPS foam can be treated to remove sharp edges to further reduce the possibility of damage occurring. For example, one or more edges of the structure could be formed from EPS foam that has been sanded or to which a router has been applied to round off the edges to reduce the likelihood of something catching a sharp edge and damaging either the polymer coating or the underlying EPS foam structure.

BRIEF DESCRIPTION OF THE DRAWINGS

The above and other features of the present invention, its nature and various advantages will be more apparent upon consideration of the following detailed description, taken in conjunction with the accompanying drawings in which:

FIGS. 3A-3C are illustrated elevation views showing, respectively, top, side, and bottom views of a lightweight, weather-resistant, duck hunting sled constructed in accordance with at least some of the embodiments disclosed herein;

FIG. 7A is three-dimensional illustrative schematic of a lightweight, insulated, weather-resistant individual duck hunting layout boat that includes a separate station for a hunting dog constructed in accordance with at least some of the embodiments disclosed herein;

FIGS. 7B-7D are illustrated elevation views showing, respectively, end, bottom and side views of the duck hunting layout boat of FIG. 7A constructed in accordance with at least some of the embodiments disclosed herein;

DETAILED DESCRIPTION OF THE INVENTION

Figure 1:
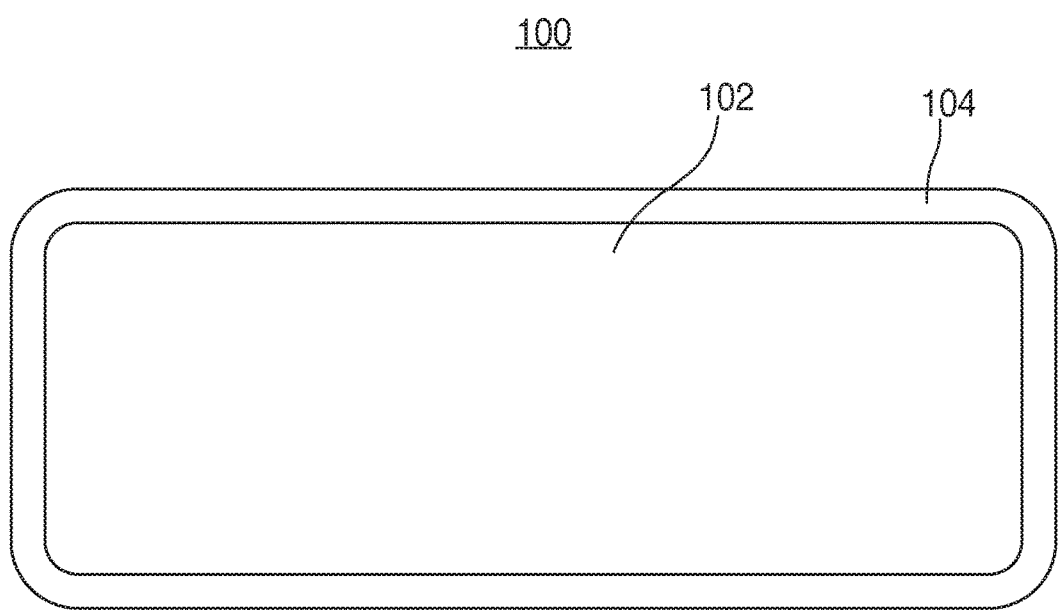
FIG. 1 is sectional elevation view of an exemplary embodiment of the present disclosure that illustrates basic lightweight, insulating, weather-resistant, building materials of at least some of the various embodiments disclosed herein.

The present embodiments disclosed herein relate to improved building materials and building structures made with those materials. In particular, the present embodiments shown in the figures and discussed below are directed to apparatus and methods for manufacturing structures that have one or more advantageous features, such as being lightweight, weather-resistant, temperature insulating, acoustic absorbing, and/or require low maintenance (which may include, for example, being easy to clean).

The building materials and structures built with those materials generally include a core of expanded polystyrene (EPS), which was produced by taking polystyrene beads and expanding them with heat and pressure to form traditional white blocks of foam. EPS foam provides a rigid structure having minimal water absorption and low vapor permanence due to its "closed-cell" nature. The closed-cell nature of EPS foam also enables the foam to withstand load and back-fill forces applied to the foam. EPS foam can also provide additional benefits acting as a temperature insulator, as well as an acoustic insulator by absorbing sound created within the completed structures. This may be compared to open-cell foams such as polyurethane foam, which is quite porous in nature and thus absorbs liquid water and water vapor, while maintaining a soft, spongy consistency (which is not compatible with building materials). It may be advantageous in building structure applications to utilize EPS foam having a density of 2 pounds per cubic foot or 3 pounds per cubic foot. The more dense the foam, the more rigid the structure (such that it may be appropriate to use higher density foam in specific circumstances where additional structural integrity in needed.

One potential disadvantage of EPS foam as a building material, however, is the generally fragile nature of the foam. For example, rubbing again the surface of bare EPS foam blocks will likely result in some of the expanded beads being pulled from the blocks, thereby reducing the long-term usefulness of the EPS foam. Anyone who has received a package or unpacked a piece of electronics that was protected by EPS foam will likely remember shaking their hands to try to remove the individual EPS polystyrene beads that have become dislodged during unpacking and that now stick to clothes or the skin due to static electricity. An additional disadvantage of EPS foam is that, in general, it cannot be painted because the paint will react with the foam and likely dissolve the foam.

The embodiments shown and described herein have turned these potential disadvantages on their head by providing a protective coating to the EPS foam such that all of the benefits of EPS can be utilized without concern for the disadvantages. In particular, one or more pieces of EPS foam are used to produce a substantially complete final structure. Once the building structure is complete, an encapsulating coating of polymer material is applied to the entire surface of the EPS material. The polymer material forms a substantially impervious protective covering that provides a combined structure having greater structural integrity than either of the individual materials. In addition, the polymer coating assists the EPS foam in resisting deformation due to pressure and compression in normal use.

The polymer coating can be formed from polyurethane, pure polyurea, or a hybrid coating of polyurethane and polyurea. Polyurethane coatings can be extremely rigid, must be top coated every 4-7 years, can be more dangerous to apply due to the strong odor while curing, and can be somewhat difficult to manage due to the longer time required for drying and curing (which can be as much as four (4) days). In addition, polyurethane coatings can fade over time from exposure to sunshine, and polyurethane coatings can result in problems due to moisture making its way into and/or through the coatings.

Polyurea coatings, on the other hand, are more flexible when cured while still providing improved structural integrity, can be completely UV protected so they will never fade, can be used to completely seal the material being coated which prevents bacteria growth in cavities and makes cleaning extremely easy. Polyurea coatings that are completely UV protected are referred to as aliphatic coatings, however, this class of polyurea coatings are very expensive. Aormatic polyurea coatings, on the other hand, are less than half the cost of aliphatic coatings, and can be easily painted. It should be noted, however, that it may be preferable to utilize water-based paints versus oil-based paints because if the oil based paint manages to find a pinhole in the polyurea coating, the paint can get under the coating and begin dissolving the EPS foam. Accordingly, in many embodiments, it has been found to be particularly advantageous to utilize closed-cell EPS foam as a core material and to utilize pure polyurea coatings and an encapsulating material. The principles of the present embodiments may, nonetheless be accomplished, by utilizing other closed-cell foams (such as polyurethane foam in injection molded applications), and polyurethane and/or polyurethane/polyurea hybrid coats by attempting to address the deficiencies of such combinations.

Some of the embodiments of structures shown in the figures and described here can be formed from a core of EPS foam which can be, for example, assembled from individual pieces of EPS foam glued together (such as via a hot glue gun), or it can be formed from one or more blocks of EPS foam that are milled, sanded or otherwise processed. In other embodiments, multiple individual pieces of EPS foam may be assembled together, and that assembly may then be milled, sanded or otherwise processed to produce the final uncoated EPS foam structure.

Some of the embodiments, such as the deer stands, duck blinds, and ice shanties, for example, can be formed from EPS foam and a polymer coating. Other assemblies can be formed from EPS foam and a sheet of reinforcing material can be applied to the interior flooring using an adhesive prior to the application of the encapsulating polymer coating. In other embodiments, a reinforcing material may be applied to the exterior of the roof prior to coating with the polymer material to prevent accidental injuries from occurring should, for example, a large branch fall from a tree on to the roof.

In some of the assembled structures, a door and one or more windows can be provided in order to further isolate the interior from the weather. In these embodiments, one or more pieces of reinforcing material, such as hardened plastic, can be adhered to EPS foam prior to the application of encapsulating coating. Hinges for the door and/or windows can be mounted to the reinforcing material without damaging the underlying EPS core. In such instances, it may also be preferable to utilize a sealant prior to the application of screws such that the screw holes remain sealed from exterior elements such as moisture. Similarly, reinforcing material can be mounted about or near cutouts for windows that provide a structurally sound material to mount interior-mounted windows or other apparatus to open and close such windows. For example, in some embodiments, a piece of reinforcing material may be glued to the EPS foam above and below the opening for the window prior to application of encapsulating polymer coating. After coating, a track may be secured to reinforcing material such that a piece of Plexiglas may be used to form the window, which can be slide open and shut in the track.

In some of the completely assembled structures, such as the deer stands and duck blinds, additional features maybe provided, such as one or more racks to mount rifles, bows, or other hunting devices, or racks to hold ducks that were obtained during the hunt. In such circumstances, additional pieces of rigid material can be applied to the EPS foam prior to the application of encapsulating polymer coating to provide a firm and stable base to which to mount the racks, etc., after the coating process is complete. Moreover, a sealant can similarly be used during the process of screwing in any mounts to that the EPS foam remains sealed from the environment (including paint).

In some of the embodiments disclosed herein, it may be advantageous to utilize different thicknesses of polymer encapsulating material to different parts of the assembling, depending on how much structural integrity is needed. For example, in order to efficiently apply the polymer coating (which is expensive), it may be advantageous to apply an encapsulating polymer coating of only roughly 25 mils to the interior surfaces, roughly 40 mils to the exterior surfaces, and roughly 60 mils to the floor and/or roof to provide additional strength, durability and protection.

It may also be advantageous to utilize EPS foam of different compression within a single assembly depending on the application. For example, it may be advantageous to utilize two pound EPS foam in manufacturing most of the portions of a deer stand because the structure needs to support one or more human beings, who might weight an average of 200 hundred pounds each or more. On the other hand, if the EPS foam was formed into a doghouse, it may only be necessary to utilize only one pound EPS foam to provide the same structural integrity for the dog using the doghouse.

Houses for animals are disclosed herein that can be formed using the building materials and principles described and shown. In these instances, the animal houses can be designed to support the animal standing or lying on the roof. In such instances, the coating of encapsulating polymer on the roof should be of a greater thickness to prevent the nails of the animal from damaging the roof, such as by applying a coating of polymer at least 60 mils thick (depending on the size on the animal). It may be advantageous to form these animal house structures as two separate parts, the body of the house and the roof (each of which is completely encapsulated in polymer material), which can be designed to fit together securely. In this manner, it would be easier to access the interior of the structure, such as for cleaning (the encapsulated polymer coating enables a user to clean the animal house by simply spraying the interior with a hose without concern of damaging the EPS foam core) or replacing bedding therein. The insulating features of the combination of EPS foam and encapsulating polymer coating provide an environment where the animal's natural body temperature could heat the interior to a comfortable temperature even in relatively harsh conditions.

It should be noted that while the animal houses shown and described herein are for a single structure that houses a single animal, it may be advantageous to provide a single structure that provides each animal with a separate entry and a semi-private, walled-off area. The roof can still be designed such that one or more openings exist between the roof and interior walls between each area so that body heat from one animal may be used to heat the entire structure instead of just the area where the animal is located.

Testing was accomplished to measure the difference in structural integrity of the building materials once the encapsulating polymer coating is applied to the EPS foam. For example, in some test, an eighteen-inch piece of one and a half pound uncoated EPS foam was placed on blocks of EPS foam spaced roughly seventeen inches apart (such that less than one inch of each end of the test piece was located on the block). An individual weighing between 150 and 200 pounds carefully stepped on and stood in the middle of the test piece, which promptly fractured and broke in two (the test piece was between 9 and 10 inches off of the ground).

In another test, a similar piece of EPS foam was coated with approximately 20-25 mils of encapsulating polymer, and then placed in a similar configuration on the EPS blocks between 9 and 10 inches off of the ground. In that instance, when the same individual stepped on the test piece in the same manner, the test piece of coated EPS foam exhibited slight downward flex of less than a half inch and did not break.

Other tests have been performed with regard to the insulating properties of the completely constructed and coated units. In these tests, a deer stand was the test unit. The deer stand was configured with approximately nine square feet of floor space (i.e., a three by three configuration), with a roof that slopes from approximately seven feet high by the door down to four feet high in the rear. The deer stand was placed outside for several days and thus was acclimated to the outside temperature prior to any testing. In one set of tests, a single can of sterno placed on the floor in the center of the stand was used to provide heating. In another set of tests, a single candle was used to provide heating. All of the tests were done after dark so that no heating from the sun would affect the tests.

In the first series of tests, the inside and outside temperatures were measured to be 35 degrees. A single can of sterno was placed on the floor and ignited and the door was closed. After a period of fifteen minutes, temperature measurements were made. The outside temperature had fallen to 32 degrees, but the inside temperature had risen to 62 degrees. After a period of another fifteen minutes (i.e., thirty minutes after the test began), the outside temperature remained at 32 degrees, but the inside temperature had risen to 68 degrees. After a third period of fifteen minutes had passed (a total of forty-five minutes), the outside temperature was remained 32 degrees and the interior temperature rose slightly to 70 degrees. At that time, the lid was placed back on the sterno extinguishing the heat source and the door to the deer stand was closed. After a period of an additional ninety minutes, another temperature measurement was made of the interior of the stand, which resulted in a reading of 48 degrees, thus illustrating the significant insulating properties of the building structures disclosed herein.

In the second series of tests, the deer stand was again acclimated outside for a period of at least two days. The ambient measured air temperature at the start of the test was 29 degrees. A standard three-inch candle with a wick was placed in the center of the deer stand on the floor and lit, and the door was closed shut. After a period of thirty minutes, temperature measurements were made which showed the outside temperature to be 26 degrees and the interior temperature to be 52 degrees. The door was closed and another sixty minutes passed before the next measurements were made. Those measurements showed a further drop in the outside to 22 degrees, while the inside temperature rose to 62 degrees, at which time the candle was extinguished. After an additional sixty minutes, measurements were made which showed the outside temperature to have dropped to 20 degrees, while the inside temperature dropped to 47 degrees. The door to the deer stand was closed for another twelve hours before a final measurement was taken. The final measurement, taken thirteen hours after the candle was extinguished showed that the outside temperature was down to 15 degrees, while the inside temperature was still 38 degrees.

Other embodiments show different structures, such as a sled that, while it can be used for a variety of purposes, may be particularly useful for duck hunting. The sled can be formed from a core of EPS foam to which various pieces of rigid material can be affixed as described in more detail below. The sled can be configured to have a front end fashioned similar to the bow of a boat so that it moves easily through water. The leading edge of the sled can have a piece of rigid material mounted to the EPS foam such that an attachment may be affixed thereto that enables the hunter to pull the sled through the water without damaging it (such as a rope, or eye bolts to which a tow rope can be attached). The rear end of the sled can be configured in a somewhat opposite configuration, in that it can be designed to have a cutout that is intended to permit the sled to fit snugly against a tree or similar structure.

The rear end of the sled may also include one or more pieces of rigid material to which mounts may be attached that can be used to attach a cord, cable, chain, or similar device to hold the sled in place against the tree while hunting. In addition, the rigid pieces on the rear end of the sled may enable drain pipes to be located there as well which can function to help remove water that may flow over the sides of the sled while it is being pull though the water. Once all of the desired rigid pieces have been affixed to the EPS foam core, the entire structure can be encapsulated with a polymer coating that renders the sled virtually indestructible. The polymer coating may be applied, for example, on the order of 20-25 mils thick, which will provide protection to the EPS core, while not being an excessive amount of polymer (the sled itself does not need to be as structurally sound as the previously described structures, since it is unlikely to support any individuals). It may be preferred, however, to apply a coating of polymer on the order of 40 or 60 mils thick in the event it is intended to support an animal, such as a hunting dog (which likely has nails that might otherwise penetrate the polymer coating which jumping on or off the sled).

Another illustration of the advantages of the building materials disclosed herein can be accomplished by using individual pieces to assemble things such as a portable, children's table and benches. In some of these embodiments, the table and chairs can be formed from five separate pieces of EPS foam that are each fully encapsulated with polymer material. The pieces can be formed with interlocking regions or keys, to help them remain together when built. For example, one piece can be the flat tabletop, while two other pieces can be the flat bench surfaces. The remaining two pieces can form the support legs for both the benches and the tabletop. One advantage of this configuration is that children can assemble and disassemble it at will. The support pieces can be configured such that a small protrusion or peg can extend from the top surface of the support leg where it meets the lower surface of either the benches or the tabletop. The encapsulated EPS core material would be highly resistant to damage, as well as being highly resistant to the weather, and thus, could remain outside year round.

Other advantages of the building materials disclosed herein include the fact the polymer-encapsulated materials can be easily painted in whatever scheme is desired. For example, a deer stand could be painted in a forest camouflage theme for one season, and a grassy camouflage theme in another season. As described above, it may be preferable to utilized a water-based paint for such a task to avoid the risk of an oil-based paint finding a pin-hole in the polymer coating and eating away at the EPS foam core.

There are a variety of other applications of the building materials disclosed herein. For example, the lightweight, but excellent structural integrity of the materials make them an excellent candidate to be used to build sets for theater and film. Walls formed of an EPS core encapsulated with a polymer exterior coating could be painted over and over for each new show, while the EPS core results in lightweight materials that can easily be moved around the stage and re-configured at will. By including a rigid reinforcing material on at least portions of one side of the materials, the building materials can support the hanging of objects, such as picture frames and the like.

Other applications for the building materials disclosed herein can include the ability to provide temporary shelter to the homeless. Portable, temporary housing units can be quickly and easily assembled that could be large enough to provide a place to sleep protected from the elements, while the insulating properties of the building materials disclosed herein may enable the units to be moderately heated with small, battery-powered devices.

Additional embodiments disclosed herein include, for example, an air conditioner utilizing the insulating properties of the polymer-encapsulated, EPS core, building materials disclosed herein. The same structure could be modified slightly to be used as a cold temperature smoker that can be used to cure meats and fish. The insulated chamber in which ice is placed in the air conditioner can be modified to support the hanging of meats and fish. The air input can be coupled to a smoke producing device such that the smoked air is pulled across the meats or fish. The smoker device can be configured to pump curing smoke into the chamber (instead of the passive air input of the air conditioner), while the temperature of the chamber remains relatively constant (a goal in smoking such as this is to prevent the smoke from heating up the inside of the smoker, in which case the meat/fish would get cooked). The temperature could be further prevented from rising by placing a small glass or bowl of ice inside the chamber, which would provide a cooling effect similar to that provided by the candle or sterno described above.

The smoker device may be formed, for example, from a can in which burning chips, such as mesquite chips. Hoses can be connected to the air input of the smoker. The output could be provided as an input top the smoker chamber. The input can be connected to a small pump that would force the smoked air to leave the can through the output hose and into the smoker or the air conditioner fan can be used to slowly pull the smoked air through the structure.

Some of the particular examples referred to above are described in more detail below. Persons of ordinary skill in the art will appreciate that many of the embodiments described herein may be combined with each other to form yet other embodiments that are not explicitly shown in the figures (such as the smoker described above).

FIG. 1 shows a basic illustration of the principles described herein regarding many, if not all, of the embodiments described and shown herein. In FIG. 1, sectional elevation view of a basic structure 100 is shown. In the cutaway view, interior core 102 formed of EPS foam is shown as being completely encapsulated by a polymer coating 104. The polymer coating 104 can be applied, for example, using a spray gun that receives as inputs, two different materials that are delivered to the gun through heated hoses. The two materials, for a pure polyurea coating, can be a resin and an isocyanate. The gun delivers both materials out of a heated nozzle that effectively mixes them together as they are sprayed out of the gun. One of the advantages of the application of pure polyurea is that the combined material begins drying almost at the same instant as it leaves the application gun, such that it begins drying at the same time it is applied. This helps prevent dripping and helps to maintain consistent levels of application of the encapsulating materials.

Figure 2A:
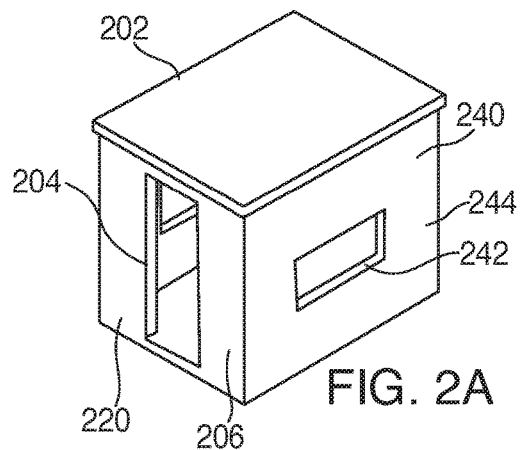
FIG. 2A is three-dimensional illustrative schematic of a lightweight, insulated, weather-resistant hunting deer blind constructed in accordance with at least some of the embodiments disclosed herein.
Figure 2B:
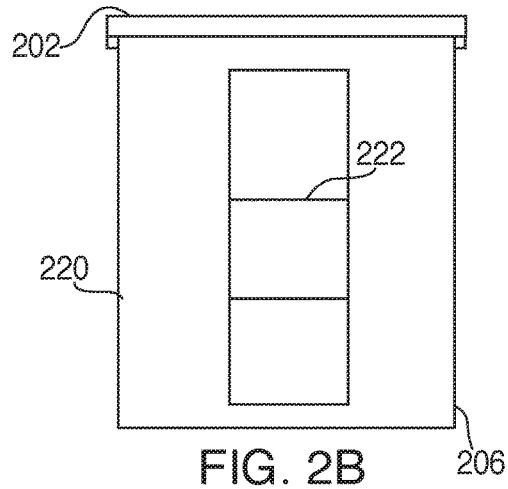
FIGS. 2B-2D are illustrated elevation views showing, respectively, front, side, and back views of the hunting deer blind of FIG. 2A constructed in accordance with at least some of the embodiments disclosed herein.
Figure 2C:
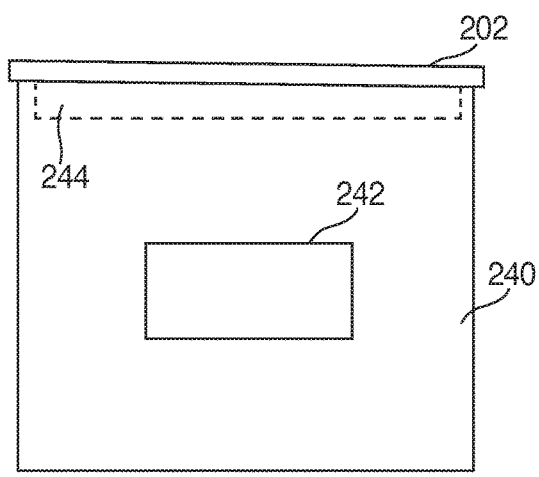
Figure 2D:
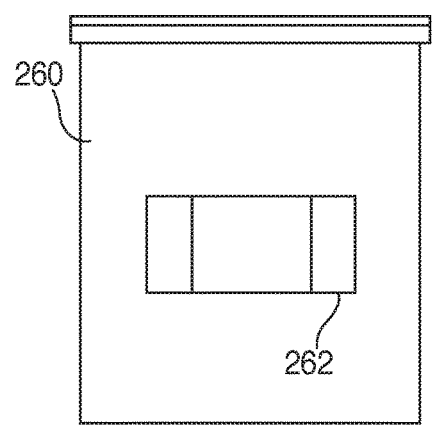

FIGS. 2A-2D show a deer stand 200 that is constructed in accordance with the embodiments disclosed herein. Individual pieces of EPS foam are glued together to form the core structure of deer stand 200, which includes front 220, back 260, sides 240, roof 202 and a floor. Deer stand 200 can also include doorway opening 204 and one or more window openings 242 and 262. It may be preferable for roof 202 to be designed such that it slopes downward from front 220 toward back 260 to reduce the possibility of animals or other objects from accumulating thereon. FIG. 2C shows one embodiment in which roof 202 can extend down below the height of the walls to region 244 to provide a more secure fit between roof 202 and the walls. FIG. 2B shows an example in which a door 222 is mounted to doorway 204 so that deer stand 200 can be secured while it is not occupied (or to prevent the elements from entering the deer stand while it is occupied). Similarly, the opening in rear wall 260 shows a window 262 that can also be used to help secure deer stand 200 when it is not occupied and to keep the elements out while it is occupied.

Figure 2E:
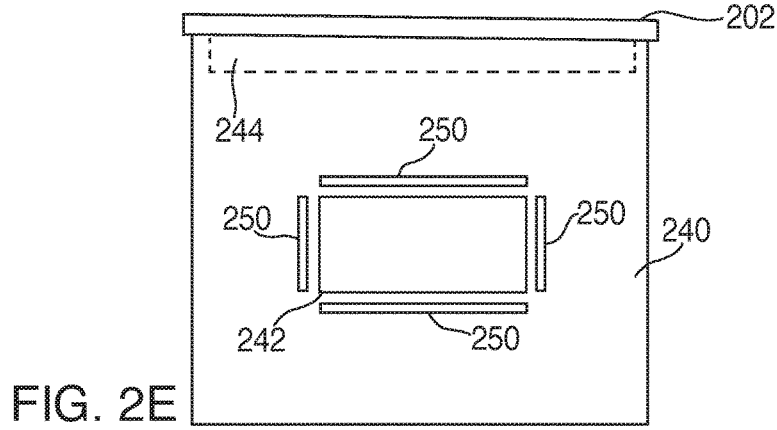
FIG. 2E is an illustrated elevation view showing an alternate embodiment of a side wall of the hunting deer blind of FIG. 2A that includes additional structure that can be affixed to the EPS foam core materials to provide anchoring points for additional hardware, such as doors and/or windows in accordance with at least some of the various embodiments disclosed herein.

FIG. 2E shows one way in which other structures may be mounted to the polymer-encapsulated EPS core via reinforcing members 250. Reinforcing members 250 may be, for example, strips of stiff, non-porous, plastic material that can ready accept and secure screws driving through it. While FIG. 2E shows reinforcing members 250 being used to provide a mounting surface for a window on deer stand 200, this particular technique may be applied to any other embodiment disclosed herein to provide a secure way to mount other devices to the encapsulated EPS core without damaging the core. Accordingly, these same techniques can be applied to secure a door, a lock, a window, a gun rack, etc., to the encapsulated EPS core. Moreover, as previously described, it may be advantageous to provide a sealant as part of the process of applying screws to the reinforcing material to seal the holes that the screws produce as they are secured to the structure.

FIGS. 3A-3C show different views of a hunting dog sled 300 that can be constructed in accordance with the principles described herein. Sled 300 includes a front structure 302, a rear structure 304 and a top surface 306 on which the hunting dog remains until a fallen duck needs to be obtained. As can be seen from FIG. 3B, front section 302 includes a raised surface 308 that can operate to reduce the amount of water that crosses over surface 306 while the sled is pulled through the water. FIG. 3B also shows that front portion 302 includes additional material 310 that provides further buoyancy that can cause front portion 302 to be raised slightly higher that rear portion 304.

Rear portion 304 can be configured as shown to make it easier to secure the sled to a tree once the hunting location has been arrived at (note the indentation at the rear of the sled). FIG. 3C show optional eyehooks 312 that can be mounted to rear portion 304 which can be used with rope (not shown) to tie sled 300 to a tree. Alternately eyehooks 312 can be applied to front portion 302 to provide a way to secure a towing rope to sled 300. As shown in FIG. 3B, it may be advantageous to provide that approximately two thirds of sled 300 is formed of EPS foam core (in height from the bottom surface to the top of raised surface 308. This helps to maintain the sled in a securely buoyant manner even if a relatively heavy hunting dog and some of the hunter's gear occupy the sled.

As shown in FIGS. 3A and 3C, a reinforcing material 303 may be included. Reinforcing material 303 may include, but not be limited to, hardened plastic, in accordance with the principles discussed above. Reinforcing material 303 is depicted as a dotted line to illustrate the fact that reinforcing material is optional, and is only provided as an embodiment of the inventions described herein.

Figure 4A:
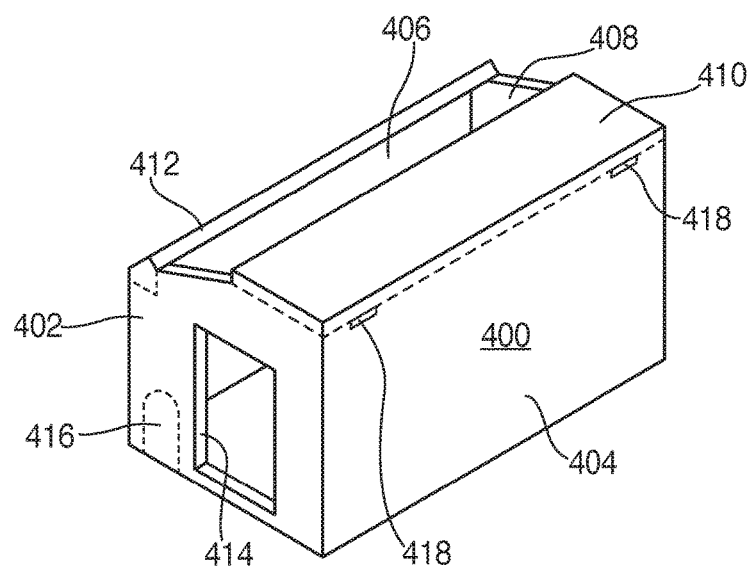
FIG. 4A is three-dimensional illustrative schematic of a lightweight, insulated, weather-resistant duck hunting blind constructed in accordance with at least some of the embodiments disclosed herein.
Figure 4B:
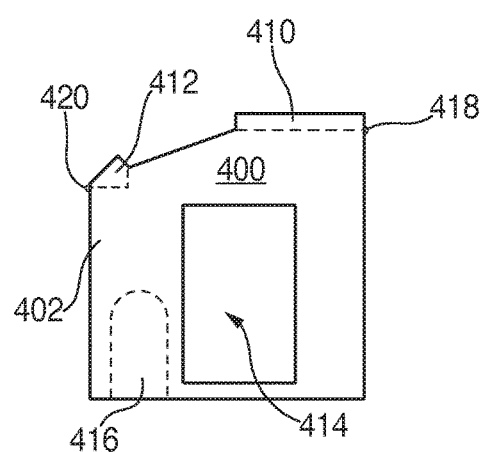
FIGS. 4B-4C are illustrated elevation views showing, respectively, side and front views of the duck hunting blind of FIG. 4A constructed in accordance with at least some of the embodiments disclosed herein.
Figure 4C:
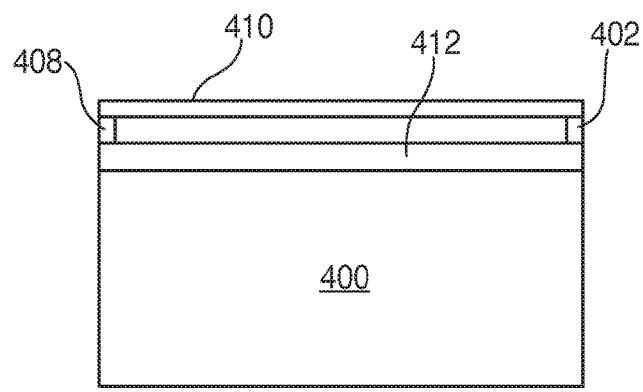

FIGS. 4A-4C show another embodiment of the principles disclosed herein in duck blind 400. Duck blind 400 includes a side portion 402 that includes an entryway 414 for humans and can include an optional entryway 416 for hunting dogs (which can, optionally, go to an internal doghouse (not shown, but can be substantially similar to the animal house described herein). Duck blind 400 can also include a rear surface 404, a front surface 408, another side surface 408 and a roof 410. Roof 410 can be secured in place permanently, or roof 410 can optionally be mounted to hinges 418 or similar mounting means (which themselves can be mounted to the encapsulated EPS core are previously described with respect to FIG. 2E), such that roof portion 410 can be opened to provide more access to the sky for hunting. Similarly, front portion 406 also includes a ridge portion 412 that can be secured in place or can optionally be designed using hinges 420 (see FIG. 4B) that enable ridge portion 412 to be rotated outward and down to form a shelf. Duck blind 400 may also be configured with an integral seating bench (not shown) mounted to the interior surface of rear wall 404. Similarly, duck blind 400 can also optionally include one or more racks across front surface 406, each of which may include locations to hold one or more rifles, as well as locations to hold ducks that have been acquired during the hunt.

In both deer stand 200 and duck blind 400, persons skilled in the art will appreciate that the structure described herein provide hunters with a highly insulated environment in which to wait for their prey to show up. As described above, actual thermal tests showed that the advantageous configurations of encapsulated EPS foam provided such a barrier to the elements, while retaining internal heat, such as body heat from the hunters. In addition, in any structure such as deer stand 200 and duck blind 400, if a built-in bench surface is provided, it may be desired to provide thermal conduits, such as conduits 512 that are shown in ice shanty 500 of FIG. 5, to direct heat or cooling directly to the hunter(s). Persons of ordinary skill in the art will also appreciate the capacity of the encapsulated EPS foam to absorb and mute sounds that are generated by the hunted that might otherwise scare away the prey.

Figure 5A:
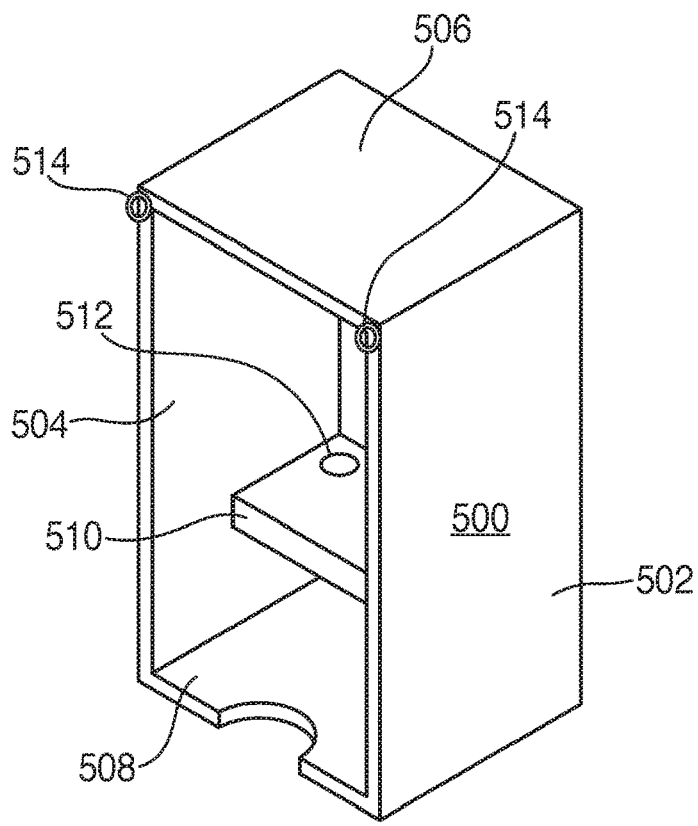
FIG. 5A is three-dimensional illustrative schematic of a lightweight, insulated, weather-resistant ice fishing shanty constructed in accordance with at least some of the embodiments disclosed herein.
Figure 5B:
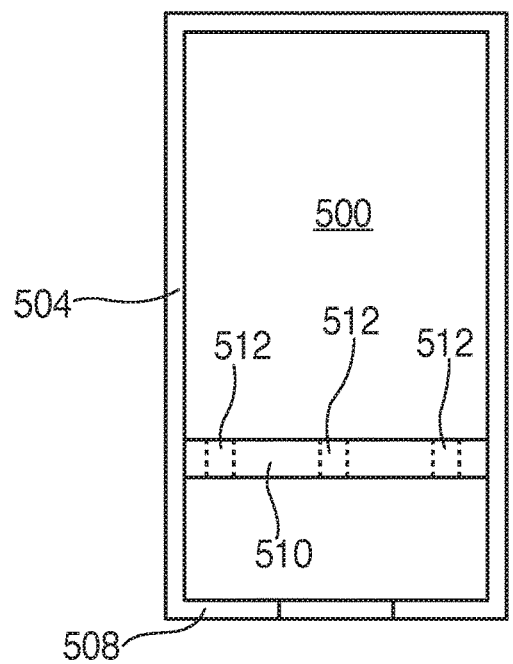
FIG. 5B is an illustrated elevation view showing a front view of the ice fishing shanty of FIG. 5A constructed in accordance with at least some of the embodiments disclosed herein.

FIGS. 5A and 5B show another embodiment of the principles disclosed herein in ice shanty 500. Ice shanty 500 includes side surfaces 502 and 504, roof surface 506, and floor surface 508 (which keeps the feet of the person off of the cold ice. Floor surface 508 includes a cutout through which ice fishing can be accomplished. Bench 510 can include one or more thermal conduits 512 (FIG. 5A shows one conduit 512, while FIG. 5B shows three conduits 512). Conduits 512 enable a small can of heat, such as a can of sterno, to provide heat directly to the person fishing.

Ice shanty 500 can also optionally include connection points 514 to which a curtain or the such can be connected to further block the person fishing from the harsh elements. Ice shanty 500 is intended to be configured for a single person, such that the lightweight, durable design enables a person who is ice fishing to place the rear surface of ice shanty 500 on the ice before loading up shanty 500 with the fishing gear. Sled rails can also be coupled to ice shanty 500 to make it even easier to pull shanty 500 along the ice to the ice fishing location. Then shanty 500 can be emptied of the fishing gear and, due to the lightweight nature of shanty 500, an individual can simply raise shanty 500 from its transportation configuration to fishing configuration.

Figure 6A:
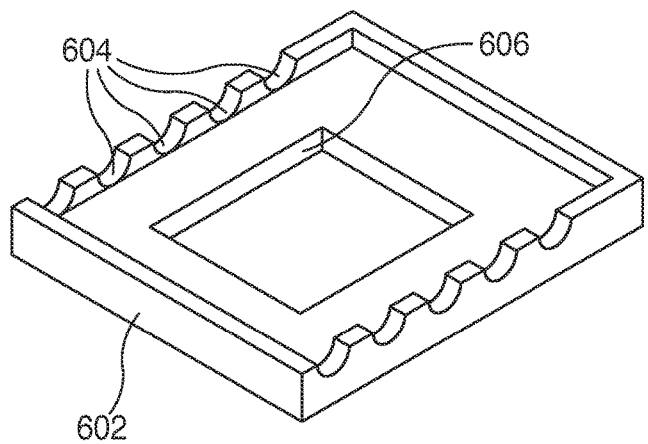
FIGS. 6A-6O are various different illustrative three-dimensional prospective views and elevation views from different perspectives showing, respectively, side and front views of lightweight, weather-resistant, insulated beehives that have reduced maintenance requirements constructed in accordance with at least some of the embodiments disclosed herein.
Figure 6B:
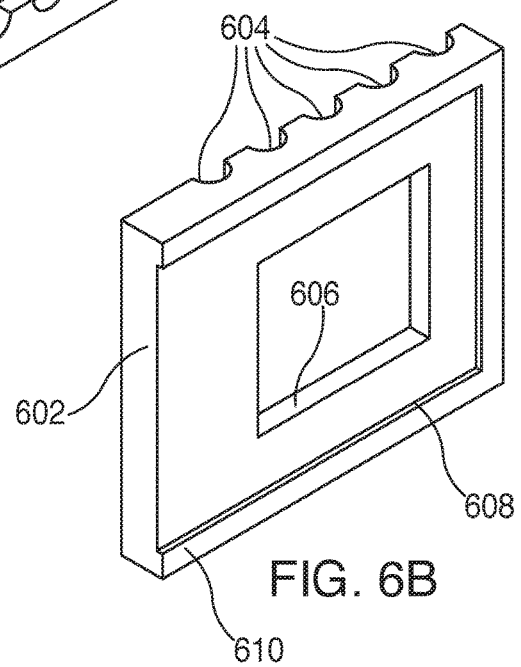
FIG. 6P is three-dimensional illustrative schematic of a lightweight, weather-resistant, insulated, beehive that has been constructed in accordance with at least some of the embodiments disclosed herein.
Figure 6C:
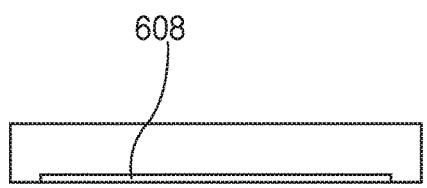
Figure 6D:
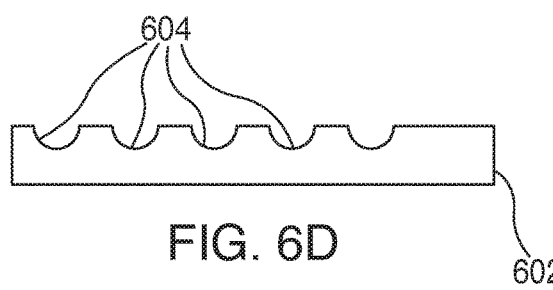
Figure 6E:
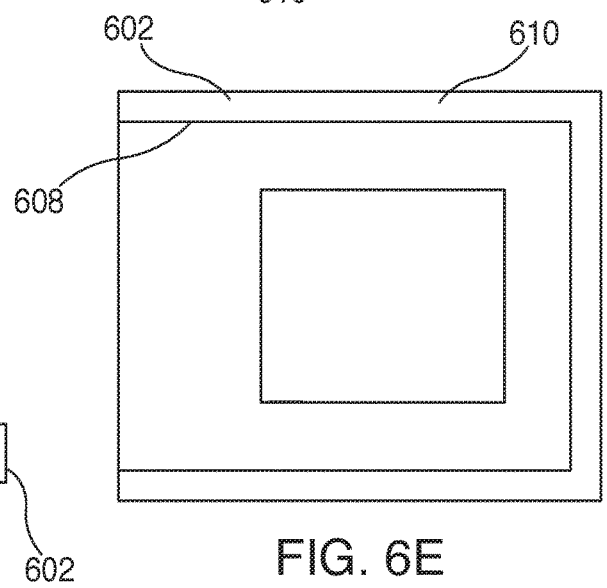
Figure 6F:
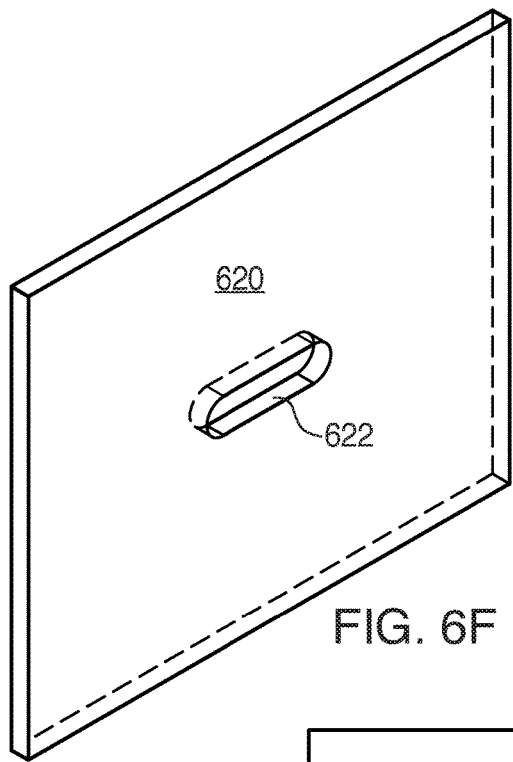
Figure 6G:
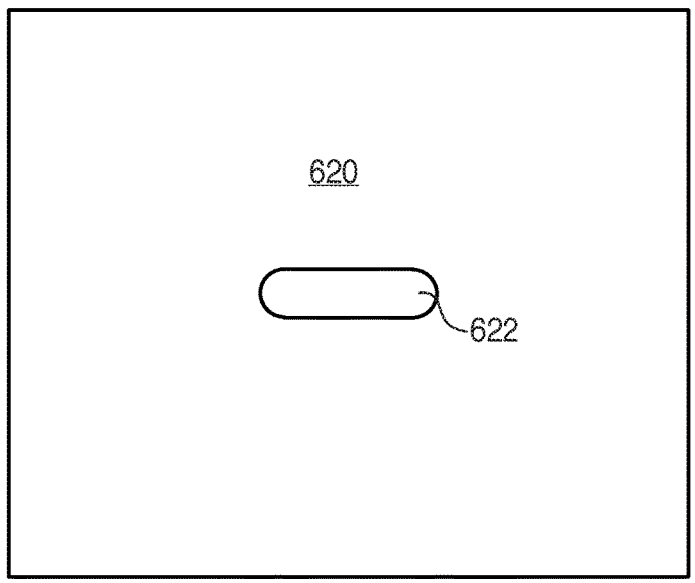
Figure 6H:
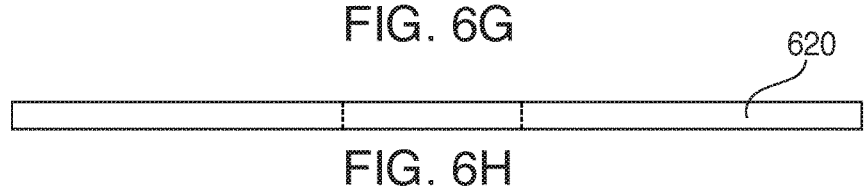
Figure 6I:
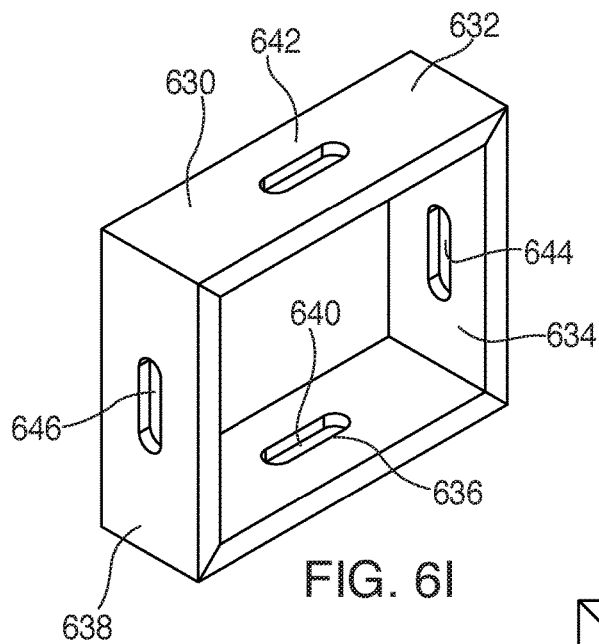
Figure 6J:
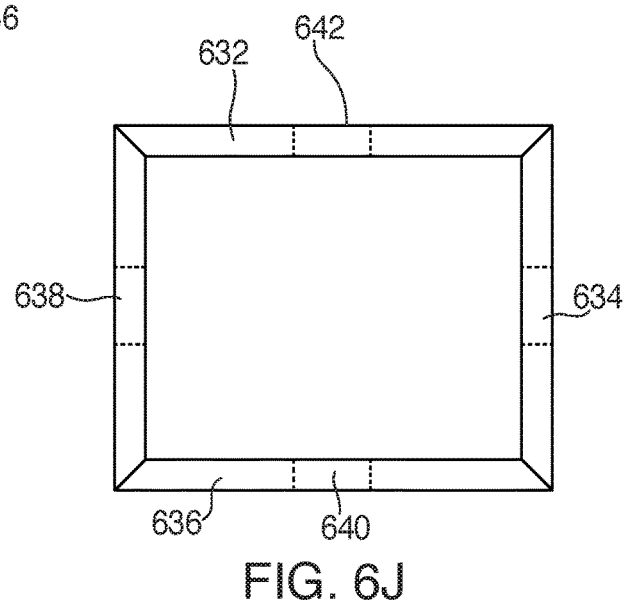
Figure 6K:
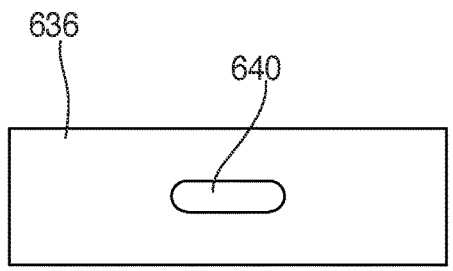
Figure 6L:
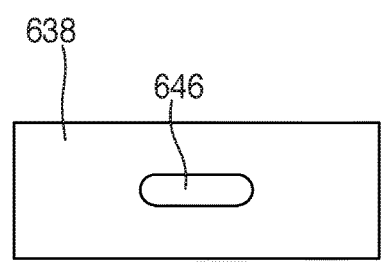
Figure 6M:
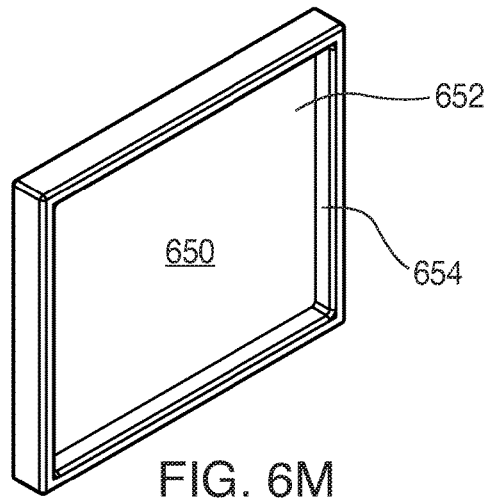
Figure 6N:
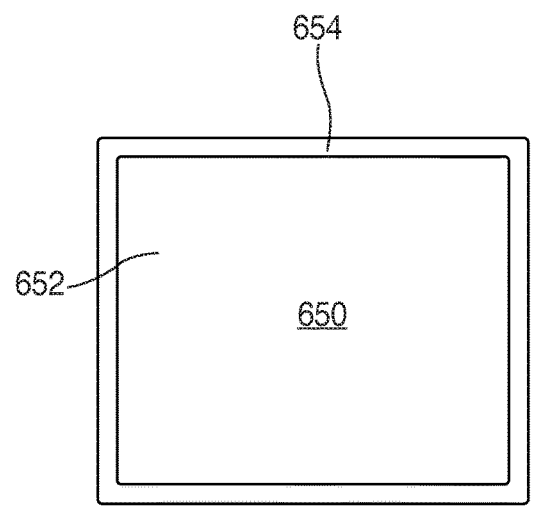
Figure 6O:
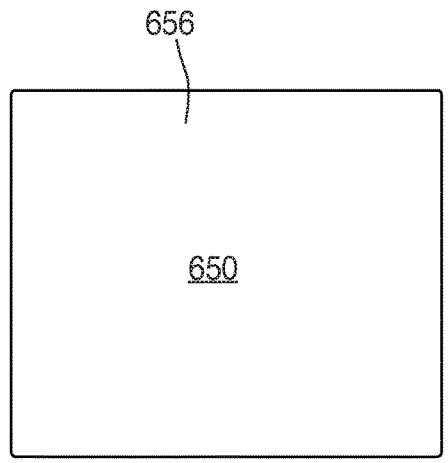
Figure 6P:
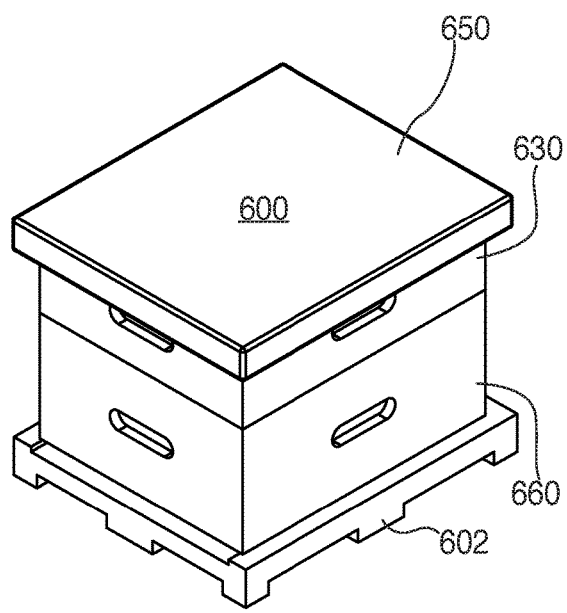

FIGS. 6A-6P show various components of a beehive 600 constructed in accordance with the principles described herein. Beehive 600 is structured in a similar manner to conventional commercial beehives that are typically trucked around from location to location during pollination season. Those commercial beehives, however, are typically made of wood that frequently wears out and has to be replaced due, at least in part, to the fact that the wood absorbs some of the waste and moisture from the bees. Persons of ordinary skill in the art will also appreciate the wooden hives are far less capable of maintaining the hives at a relatively constant temperature in both cold and hot conditions. This can result in the worker bees having to work excessively hard to maintain the hive's temperature, thereby reducing the production of honey.

Beehive 600, on the other hand, is formed of individual pieces of encapsulated EPS foam that can operate to maintain the temperature of the hive at more uniform temperatures both during hot conditions and during cold conditions. In addition, the encapsulated EPS foam will not absorb the moisture, honey or waste products from the bees, and can be easily cleaned when cleaning is required (versus the wooden hives that are difficult to clean and can suffer a loss in life every time they are soaked as the wood absorbs more water and degrades slightly). Accordingly, bees maintained in encapsulated EPS foam hives should be more productive than bees in wooden hives, while the lifespan of the encapsulated EPS hives are essentially endless.

Beehive 600 includes a bottom shelf 602 that provides a way for bees enter and exit the hive via openings 604. A bottom tray may be slid in to the hive via indentation 608. A center opening 606 at the bottom is also provided. An lower extension 610 forms indentation 608, which completes the bottom layer of beehive 600.

The second and fourth layers are shown in FIGS. 6I-6L, which can be described as the beehive shallow. In the shallow, plates of honeycomb (not shown) are provided for the bees to build their homes. Each of the shallows are designed for a different purpose. The lower shallow is designed as a home for the queen bee, which is not permitted to travel to the shallow where harvestable honey is produced. The queen is prevented from crossing from one shallow to the other via inner cover 620 that is shown in FIGS. 6F-6H.

Inner cover 620 includes an opening 622 that is large enough for worker bees to travel through, but small enough to prevent the queen been from traveling through. Accordingly, the queen is prevented from traveling to the upper shallow where harvestable honey is produced. Each of the shallows 630 can be identical to include sides 632, 634, 636, and 638, each of which has openings for the worker bees 640, 642, 644, and 646. In other embodiments, the lower shallow can be larger in height than the upper shallow, such as is shown in completely assembled beehive 600 in FIG. 6P.

The upper shallow is then covered by lid 650, which can be configured to be slightly larger than the perimeter of the upper shallow such that lid 650 can fit securely over each of the sides of the upper shallow 630. Lid 650 includes an inner surface 652, a securing ridge 654 and an outer surface 656.

FIGS. 7A-7D show various views of still another embodiment of the principles described herein in layout boat 700, which is intended to be a single person boat that a duck hunter can use to lay on the water in anticipation of the hunt. The hunter can lay down in section 702, which has room for one or more hunting guns. Layout boat 700 also includes a region 704 that is separate and distinct from the hunter region for the hunting dog. Region 704 is configured such that any water that might be brought aboard the boat by the dog is prevented from getting to the hunter's area to help maintain the hunter in a dry condition. Boat 700 can also include a region 706 to store materials, such as shotgun shells. The front of boat 700 can be configured with angled surface 708 to further insure that the hunter remains dry. The encapsulated EPS foam material utilized in constructing boat 700 provides boat 700 with a high degree of buoyancy that enables the hunter to remain dry even as the hunting dog jumps on and off region 704 during the hunt.

Figure 8A:
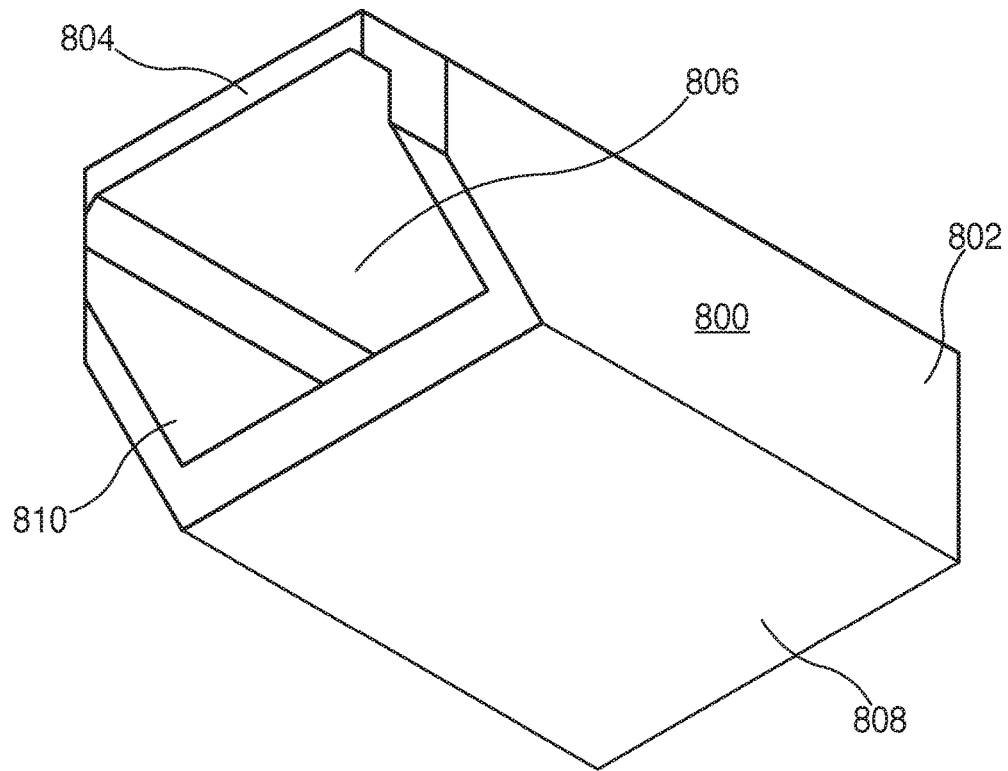
FIG. 8A is three-dimensional illustrative schematic of a lightweight, insulated, weather-resistant individual duck hunting dog blind that provides a hunting dog with cover from ducks flying overhead, while also providing the dog with an insulated surface to rest upon within a housing constructed in accordance with at least some of the embodiments disclosed herein.
Figure 8B:
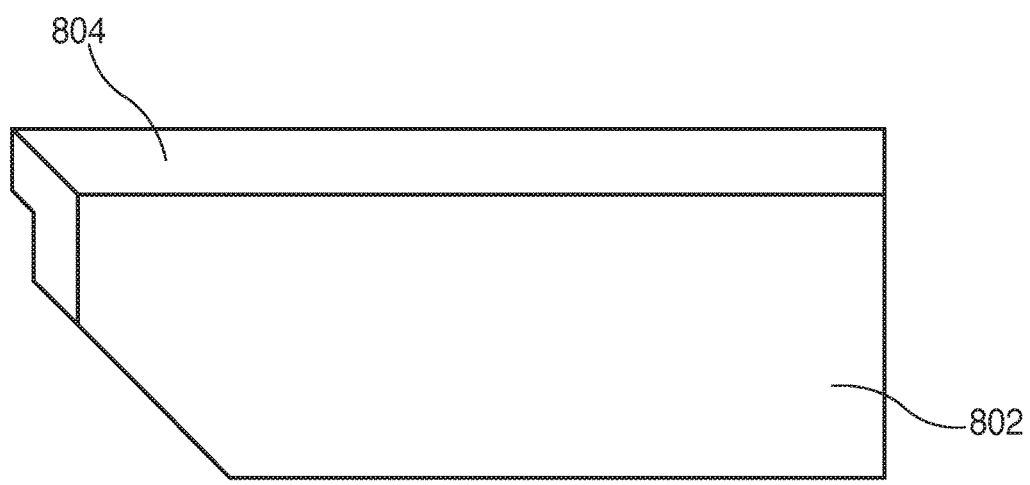
FIG. 8B is an illustrated elevation view showing a side view of the duck hunting dog blind of FIG. 8A constructed in accordance with at least some of the embodiments disclosed herein.
Figure 9A:
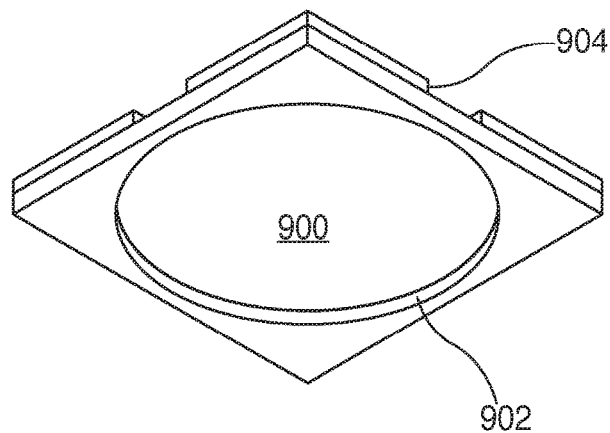
FIG. 9A is three-dimensional illustrative schematic of a lightweight, weather-resistant drum containment and securing device that enables a large round drum to be safely secured to a pallet or transportation vehicle that is constructed in accordance with at least some of the embodiments disclosed herein.
Figure 9B:
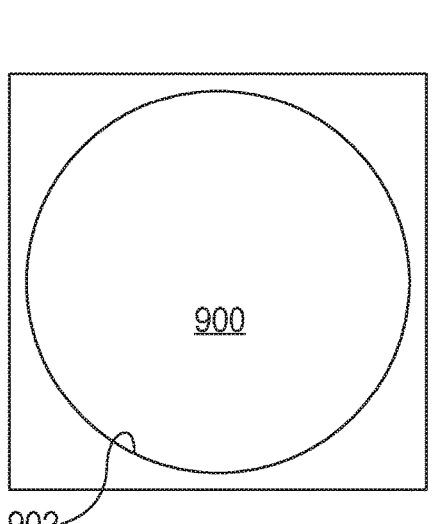
FIGS. 9B-9D are illustrated elevation views showing, respectively, bottom, top, and side views of the drum containment and securing device of FIG. 9A constructed in accordance with at least some of the embodiments disclosed herein.
Figure 9C:
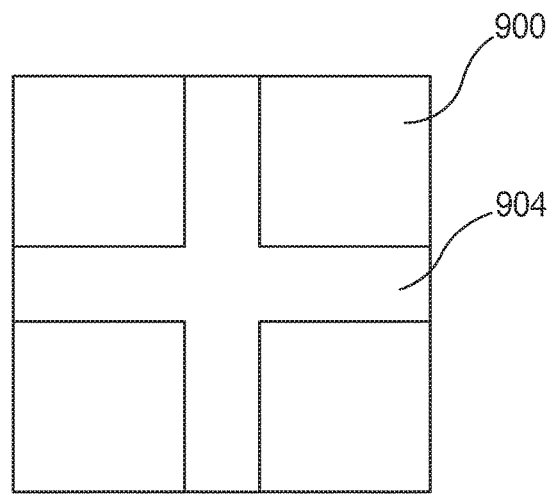
Figure 9D:
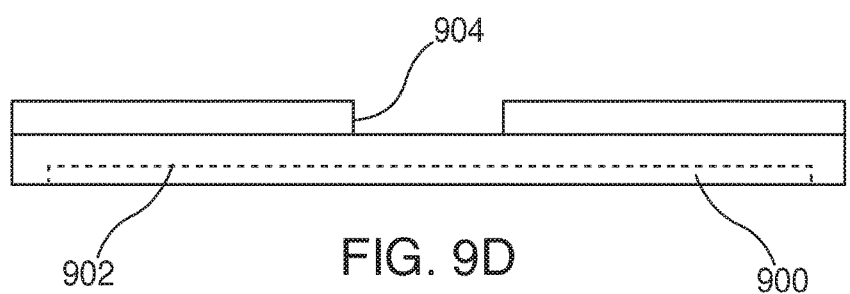

FIGS. 8A and 8B show various views of yet another embodiment of the principles disclosed herein in hunting dog blind 800, which provides the hunting dog with a place to rest and stay warm or cool off out of the eye of the ducks. Dog blind 800 includes side surfaces 802 and 810, top surface 804, interior portion 806 where the dog rests, and lower surface 808. Dog blind 800 is formed from EPS foam and then encapsulated in polymer coating to form an insulated, lightweight housing for the dog. As is apparent from FIGS. 8A and 8B, the upper surface extends further out than the lower surface to help keep the hunting dog out of eyesight of the ducks.

FIGS. 9A-9D show a different unitary structure in drum containment lid 900 that can be utilized to secure individual, large, heavy oil drums to a pallet or vehicle for transportation. Containment lid resolves a problem that currently exists in that all surfaces of a conventional oil drum are round, such that conventional binding straps will simply slide off the drums. Some attempts to solve that problem have included binding multiple oil drums together to form a bigger, more square unit that can be more easily secured.

Containment lid 900 includes two very different surfaces that enable individual oil drums to be safely secured. Interior surface 902 is a substantially round surface that is configured to be slightly larger that a conventional oil drum lid. Accordingly, containment lid 900 can be placed on top of an oil drum and it will be held in place by the rounded interior edge of surface 902. The exterior surface, however, is configured as a square with valleys 904 that are adapted to accept conventional binding straps (not shown) that can be used to secure the drum to a pallet or vehicle for transportation. By forming containment lid of encapsulated EPS material, containment lid 900 is able to have two completely different shapes that accomplish both needs. In addition, the containment lid should be able to withstand virtually material that might leak from the drums with causing harm to containment lid 900.

Figure 10A:
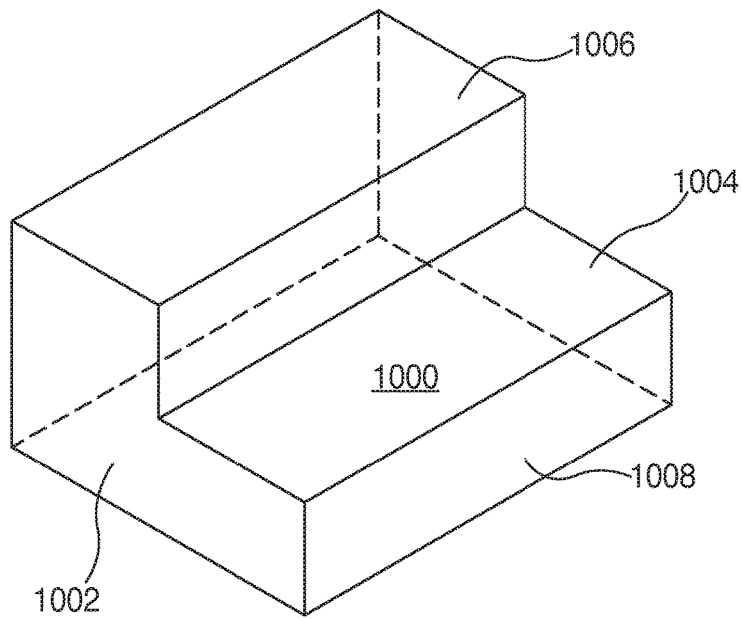
FIG. 10A is three-dimensional illustrative schematic of a lightweight, weather-resistant, portable staircase that can be used with, for example, mobile homes, RVs, portable camping units, etc., that is constructed in accordance with at least some of the embodiments disclosed herein.
Figure 10B:
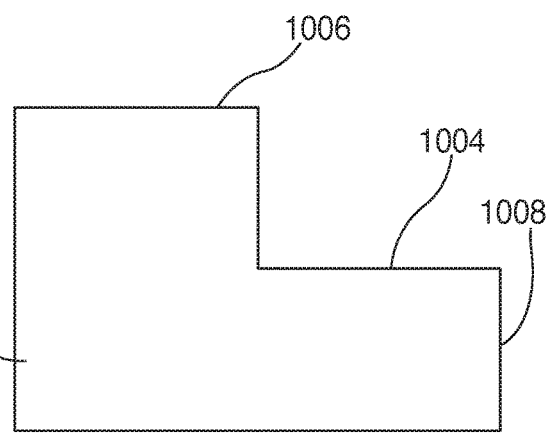
FIGS. 10B-10C are illustrated elevation views showing, respectively, side and front views of the portable staircase of FIG. 10A constructed in accordance with at least some of the embodiments disclosed herein.
Figure 10C:
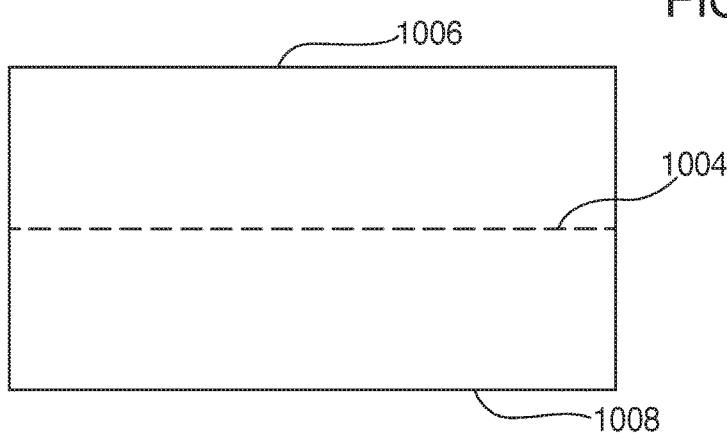

FIGS. 10A-10C show another embodiment of the principles disclosed herein in step assembly 1000, which, while shown as a simple two step device, can be formed into any number of steps. Step assembly 1000 includes side surface 1002, lower step surface 1004, upper step surface 1006 and front surface 1008. Step assembly 1000 can be formed from one or more pieces of EPS foam and encapsulated in polymer coating to provide a lightweight, portable, durable device that can be utilized to for safe ingress and egress to mobile homes, RVs, campers and the like, all of which are essentially non-fixed residences that typically cannot include permanent steps for entry. Moreover, the encapsulated coating can be easily cleaned with worrying about causing damage to the steps.

Figure 11A:
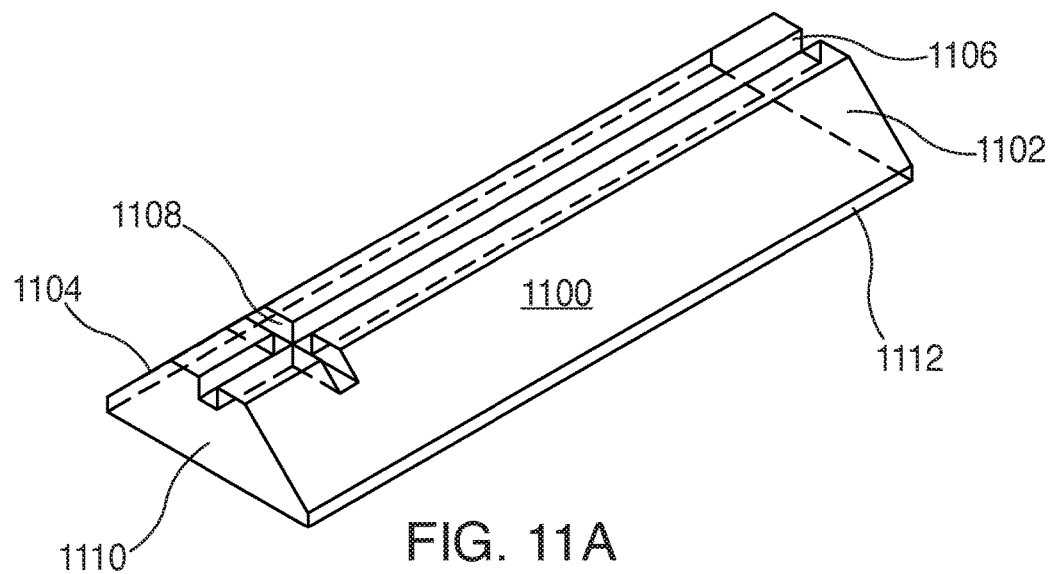
FIG. 11A is three-dimensional illustrative schematic of a lightweight, weather-resistant, berm boarder device that can be used to create large areas protected from potentially hazardous materials, that is constructed in accordance with at least some of the embodiments disclosed herein.
Figure 11B:
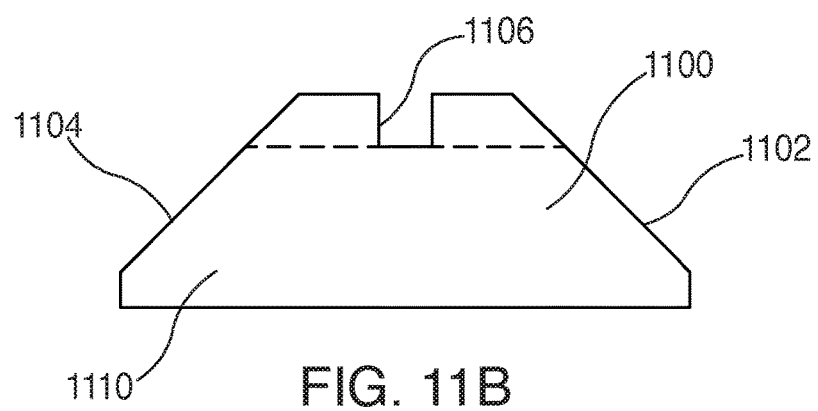
FIGS. 11B-11C are illustrated elevation views showing, respectively, side and front views of the berm boarder device of FIG. 11A constructed in accordance with at least some of the embodiments disclosed herein.
Figure 11C:
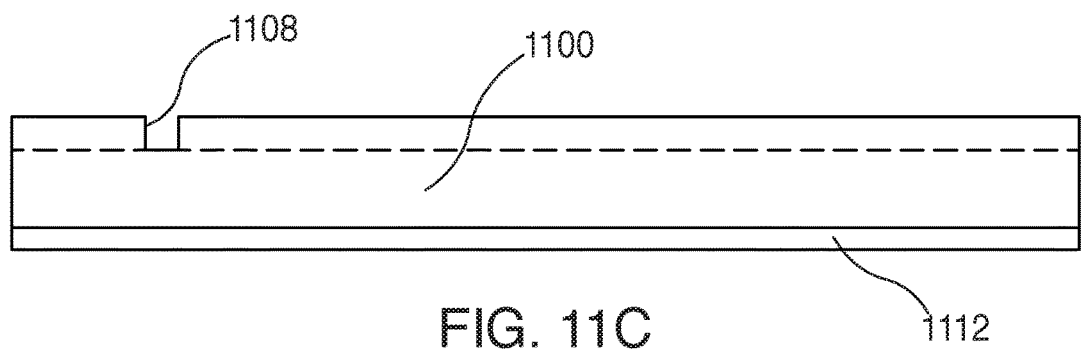

FIGS. 11A-11C show still another embodiment of the principles disclosed herein in berm boarder 1100 that can be used to form a large containment pad. For example, a series of berm boarders 1000 can be arranged in a wide circle large enough, for example, for an eighteen-wheeler to drive into. A containment sheet that is basically impervious to the materials being dealt with can then be applied over the berm boarders. Individual securing members, such as rods (not shown) can be pressed against the containment sheet to cause the containment sheet to be pressed into valley 1106 and secured therein. Additional cross valley 1108 can be used to secure the berm boarders to each other. Surface 1102 and 1004 are configured such that a vehicle can drive over the berm board without damaging it or the containment sheet.

Figure 12A:
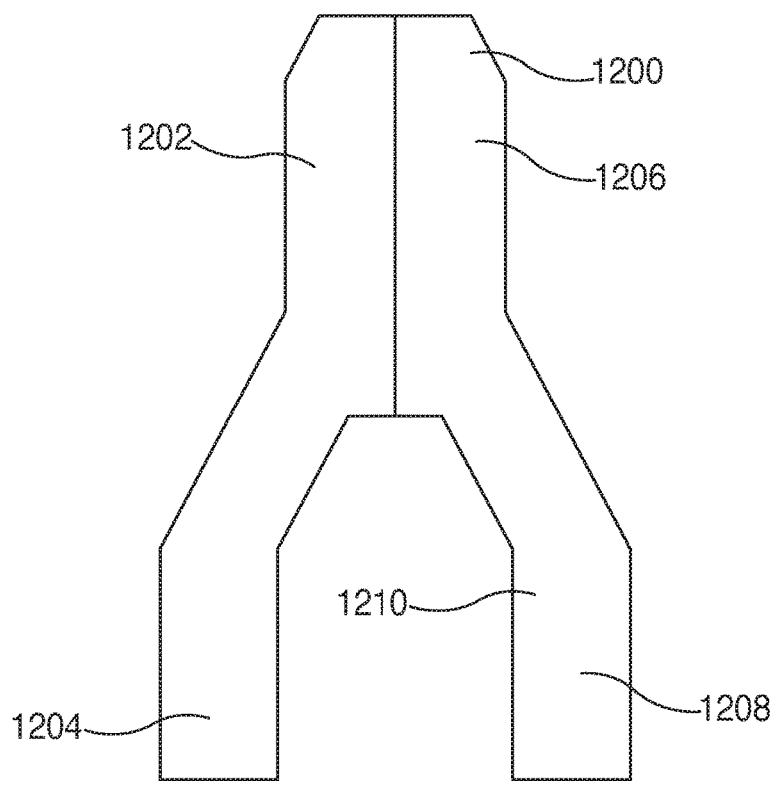
FIGS. 12A and 12B are illustrated elevation views showing, respectively, side and front views of a lightweight, portable, weather-resistant, low maintenance, crowd barricade constructed in accordance with at least some of the embodiments disclosed herein.
Figure 12B:
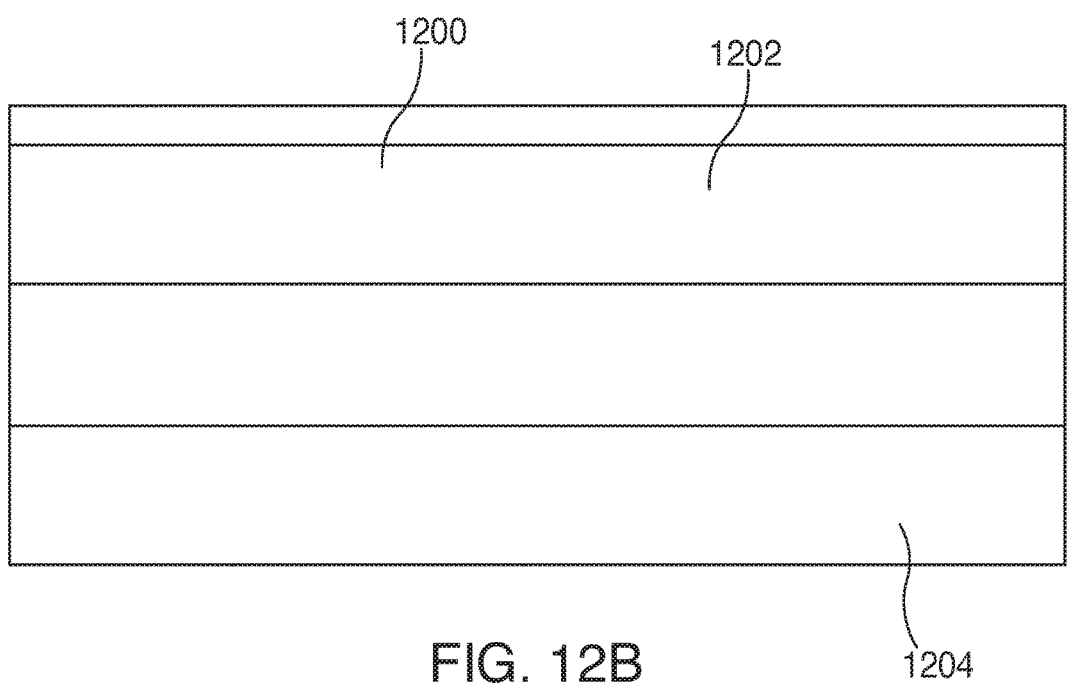

FIGS. 12A and 12B show an embodiment of the principles disclosed herein in lightweight, durable, barricade 1200. Barricade 1200 can be formed from one or more pieces of EPS that can be encapsulated in polymer coating to form basically indestructible barriers that are easy to transport, set up, and store. Barrier 1200 includes upper surface 1202, lower surface 1204 and end surface 1206. Barrier 1200 can be formed in two pieces of identically carved EPS foam that can be adhered to each other using an adhesive such as a hot glue gun. The nature of the polyurea encapsulating material is that it can be painted any color and thus, can be painted bright reflective orange and white, for example.

Figure 13A:
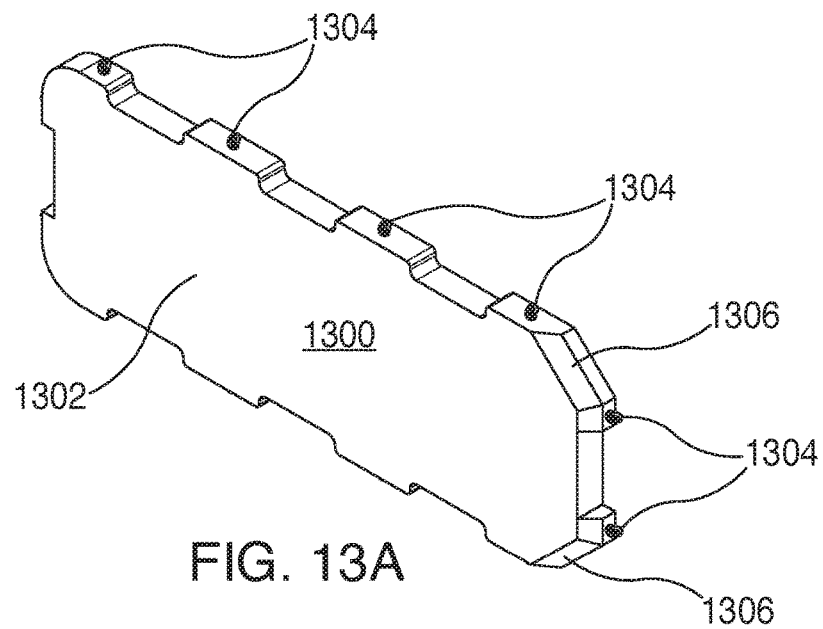
FIG. 13A is three-dimensional illustrative schematic of a lightweight, weather-resistant, durable, low maintenance, emergency sled that can be used to transport injured or disabled persons across ice, snow, or other surfaces, that is constructed in accordance with at least some of the embodiments disclosed herein.
Figure 13B:
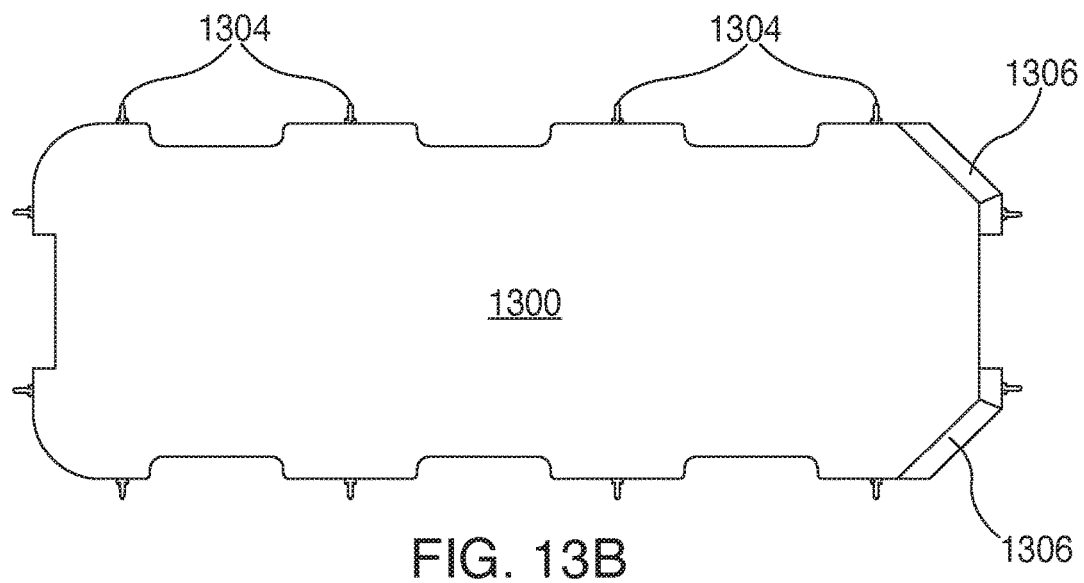
FIGS. 13B-13C are illustrated elevation views showing, respectively, top and side views of the emergency sled of FIG. 13A constructed in accordance with at least some of the embodiments disclosed herein.
Figure 13C:
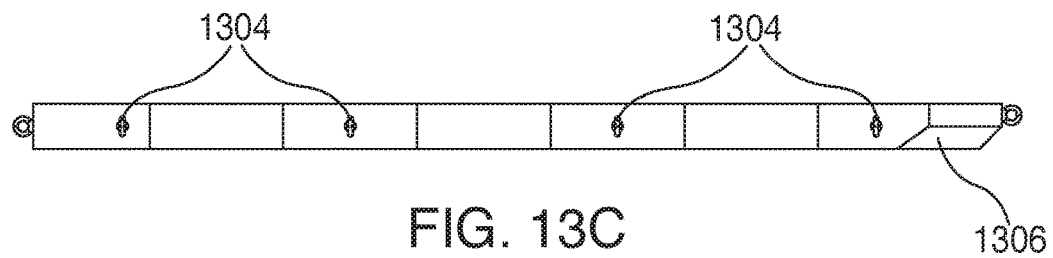

FIGS. 13A-13C show various views of another embodiment of the principles disclosed herein in rescue sled 1300 that can be formed of EPS foam and encapsulated in polymer coating. Sled 1300 will then be an extremely lightweight, virtually indestructible device that can be used to transport the injured and ill across virtually any surface including, ice, snow, water (because sled 1300 is naturally buoyant). Sled 1300 can include a lower surface 1302 that can glide along any surface, connection points 1304 that can be used to tied the injured party to sled 1300, or to secure ropes of other apparatus to assist in moving the sled.

Figure 14:
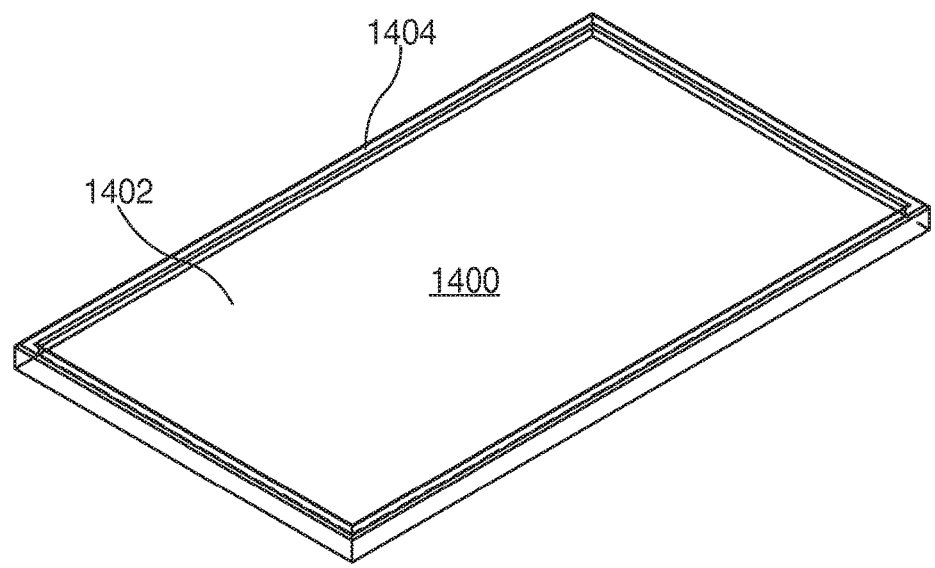
FIG. 14 is three-dimensional illustrative schematic of a lightweight, weather-resistant, durable, low maintenance, containment pad that can be used to protect the ground and underlying surface while performing maintenance on vehicles that may contain potentially hazardous materials, such as trains, trucks, and cars, that is constructed in accordance with at least some of the embodiments disclosed herein.

FIG. 14 shows a three dimensional perspective view of a railroad containment pad 1400 that is similar to the containment pad described above with respect to berm boarders 1100, except that containment pad is a single, self-sufficient unit that includes a containment surface 1402 and a containment ridge 1404. The nature of the polymer-encapsulated EPS foam is that it can be placed under a portion of a train that might, for example, be leaking oil, while that train is being repaired.

Figure 15A:
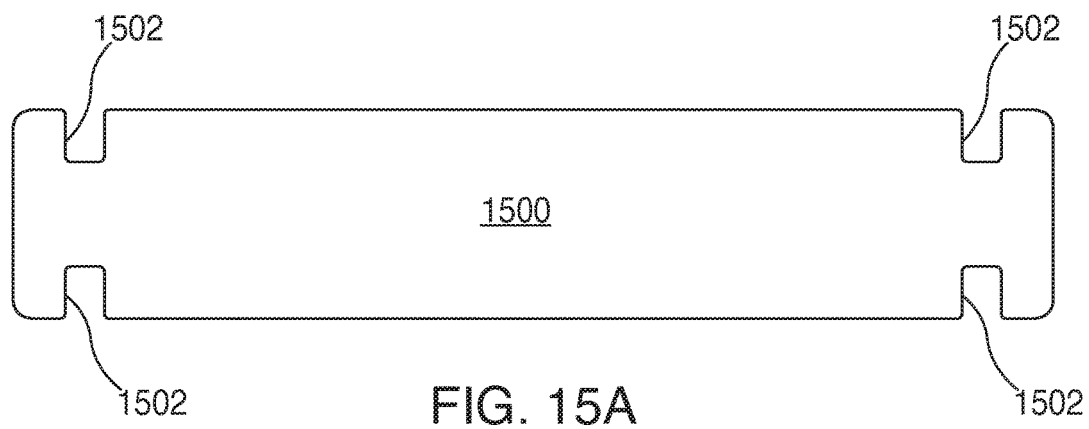
FIGS. 15A-15B are illustrated elevation views showing, respectively, top and side views of lightweight, weather-resistant, low maintenance, modular building materials constructed in accordance with at least some the embodiments disclosed herein.
Figure 15B:

FIGS. 15A and 15B show views of individual building components 1500 that each are individually polymer-encapsulated EPS foam cores that can be utilized to assemble virtually anything that requires substantial strength and durability. Each of components 1500 includes interlocking regions 1502 that interlock with each other.

Figure 16:
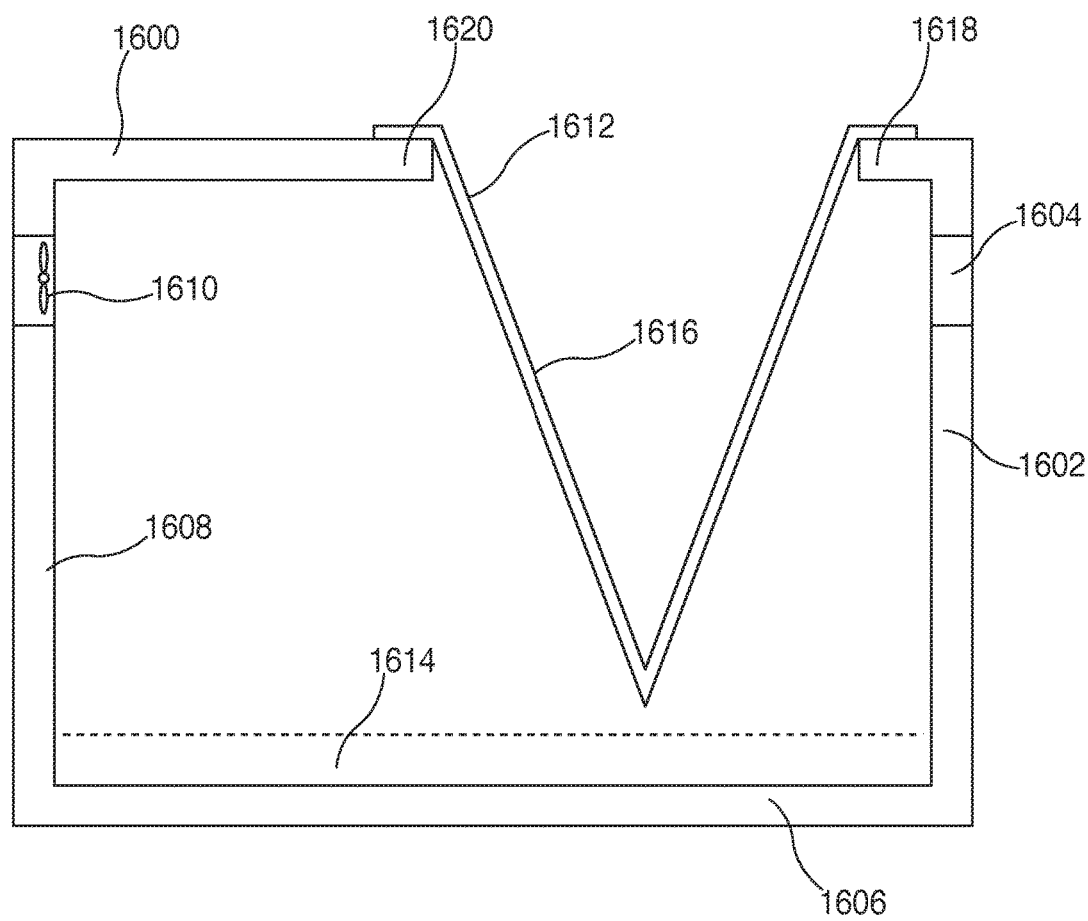
FIG. 16 is an illustrated elevation view showing a side view of a lightweight, weather-resistant, insulated, low maintenance, air conditioner constructed in accordance with at least some of the embodiments disclosed herein.

FIG. 16 shows a side schematic view of an embodiment that utilizes various principles described herein in air conditioner 1600. Air conditioner 16 includes a basic box-like structure that includes a backside 1602, a front side 1608, and a bottom 1606. Backside 1602 includes an air input port that permits the ingress of air into air conditioner 1600 during normal operation. Front side 108 includes an air outlet port that also includes itself an electrically power fan 1610 that when activated, pulls air through air conditioner 1600. Each of the surfaces of air conditioner 1600 is formed of EPS foam that is then encapsulated in a polymer coating to provide extremely high water/moisture resistance, as well as very strong insulating capabilities. Extended from front side 1608 is upper front extension 1620, while upper back extension 1618 extends from rear wall 1602.

Air conditioner 1600 also includes a thermally conductive sheet that may, for example, be formed of metal such as thermally conductive V-shaped sheet 1612. In order to utilize air conditioner 1600, V-shaped sheet 1612 is temporarily removed, and a small portion of ice is place at the bottom of the air conditioner, such that the ice does not exceed the height of limit 1614. The lowest portion of V-shaped sheet 1612 is designed such that it will not be in physical contact with the ice at the bottom of the air conditioner. Once the ice has been put in place, V-shaped sheet 1612 is placed back inside air conditioner 16, such that it makes contact with upper front surface 1620 and upper rear surface 1618. Ice is then used to fill up the interior surface 1616 of the v-shaped sheet and a lid (not shown) is placed on top on the unit to close and seal it. When electrical power is applied to the fan, the fan pulls air through the unit such that it travels as long a path as possible across the metal sheet, which is being cooled by the ice. The cooled metal sheet transfers the "coolness" from the sheet to the moving air, which is then exhausted through the air outlet port. Similar to the tests described above, air conditioner 1600, using ice, can cause a great reduction in the interior temperature of, for example, the deer stand or duck blind, due at least in part to the strong insulating effects of all of the polymer-encapsulated EPS foam components.

Figure 17A:
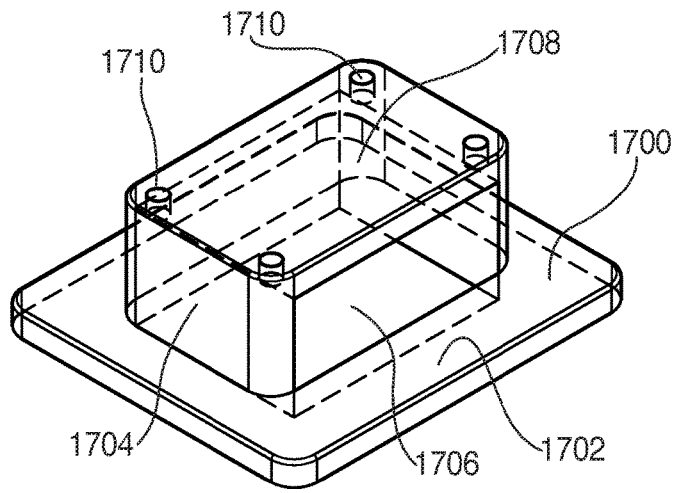
FIG. 17A is three-dimensional illustrative schematic of a lightweight, weather-resistant, durable, low maintenance, floating picnic table that can be used in swimming pools, lakes, ponds, or other bodies of water to provide individuals in the water with a stable surface, that is constructed in accordance with at least some of the embodiments disclosed herein.
Figure 17B:
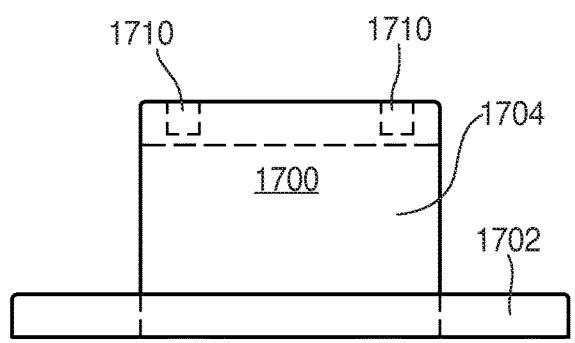
FIGS. 17B-17C are illustrated elevation views showing, respectively, side and top views of the floating picnic table of FIG. 17A constructed in accordance with at least some of the embodiments disclosed herein.
Figure 17C:
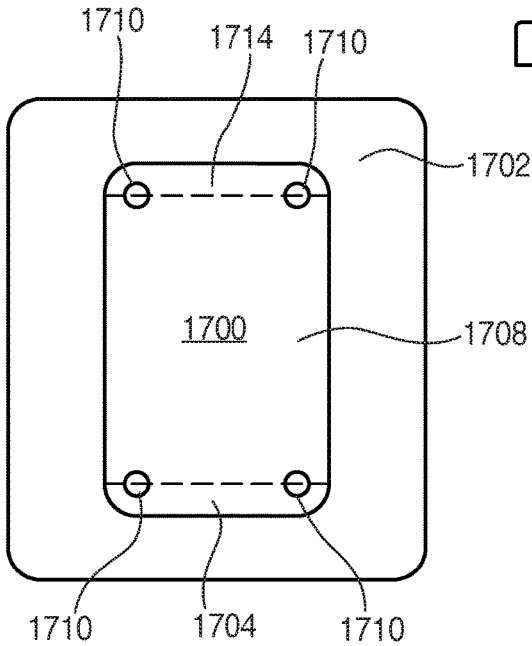

FIGS. 17A-17C show still another embodiment that utilizes the principles described herein in floating picnic table 1700, which can be used on any free-flowing body of water, such as a swimming pool, lake or pond. Table 1700 includes a flat surface 1702 that floats on the water and can be used to support one or more objects, such as a bowl of chips or plate of food. Table 1700 also includes sides 1704 and 1714 that support an upper surface 1708, which can be configured with openings appropriate to function as cupholders. Table 1700 also includes an opening 1706 that helps to maintain the floating table at a relatively constant location. As previously described, table 1700 is formed from EPS foam that is then encapsulated in a polymer coating that renders table 1700 and essentially water-proof. In addition, the interior EPS core enables table 1700 to have a very high buoyancy factors, such that the table will remain "sea-worthy" to the benefit of all using it.

Figure 18A:
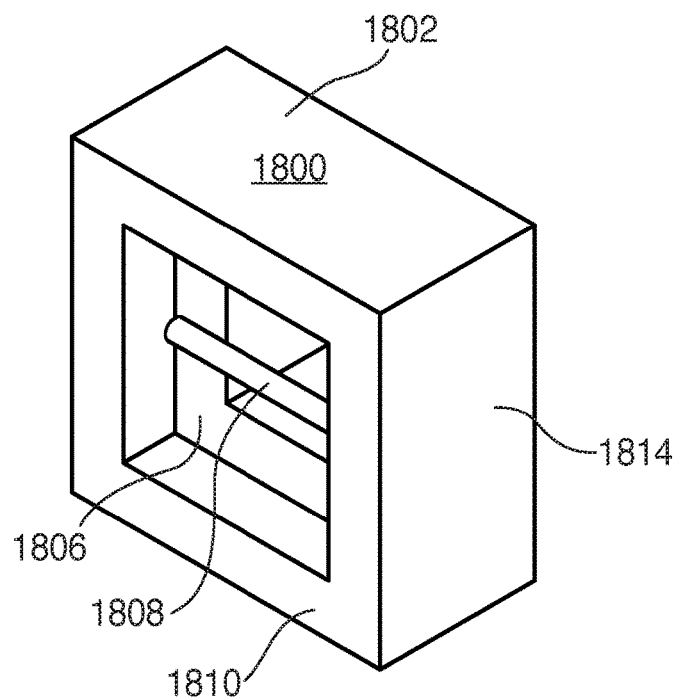
FIG. 18A is three-dimensional illustrative schematic of a lightweight, weather-resistant, durable, holder for automatic mechanical fishing reels, such that they can be used free-floating in water, that is constructed in accordance with at least some of the embodiments disclosed herein.
Figure 18B:
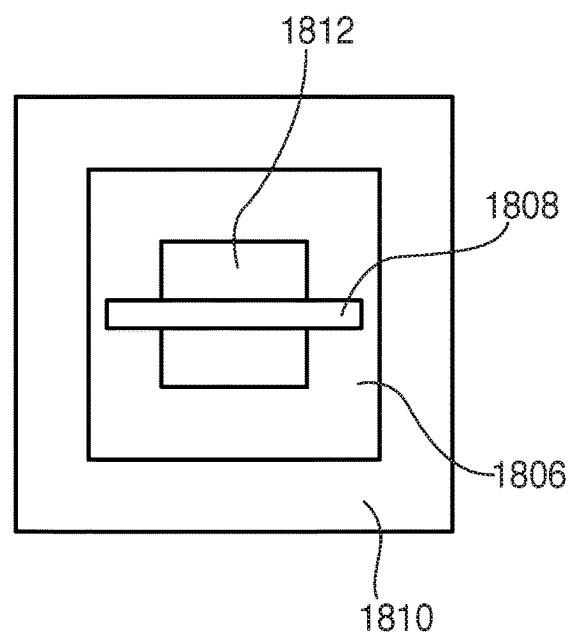
FIG. 18B is an illustrated elevation view showing a top view of the holder for automatic mechanical fishing reels of FIG. 18A constructed in accordance with at least some of the embodiments disclosed herein.

FIGS. 18A and 18B show yet another embodiment that utilizes the principles described herein in an automatic mechanical fishing device holder 1800, which can be used with automatic fishing devices such as a Yo-Yo fishing device. A Yo-Yo fishing device is typically connected to a tree above water to be fished. A line is dropped from the Yo-Yo, which is essentially a spring-loaded fishing reel. When a fish bites, the spring is released and the device automatically reels in the catch. Holder 1800 includes parallel pairs of sides 1802 and 1804, support surface 1806, and rod 1806 that can be secured to surface 1806. Holder 1800 is formed of EPS foam that the encapsulated in polymer coating that renders holder 1800 essentially impervious to water and moisture. The structure of parallel sides 1802 and 1804 permits holder 1800 to be used in free-flowing water, thereby freeing the person fishing from having to tie to the Yo-Yo device to a tree. For example, a person can take a half a dozen holders 1800 equipped with Yo-Yos out on a boat to the middle of a lake and set the holders 1800 off in the water. Each time a fish bites, the Yo-Yo will be triggered to reel in the catch.

Figure 19A:
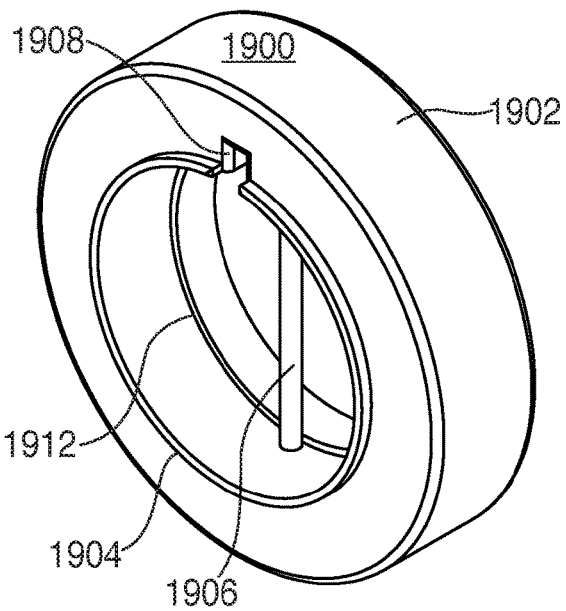
FIG. 19A is three-dimensional illustrative schematic of a lightweight, weather-resistant, durable, holder for fishing tip up devices that can be utilized for ice fishing and for fishing in free-floating water, that is constructed in accordance with at least some of the embodiments disclosed herein.
Figure 19B:
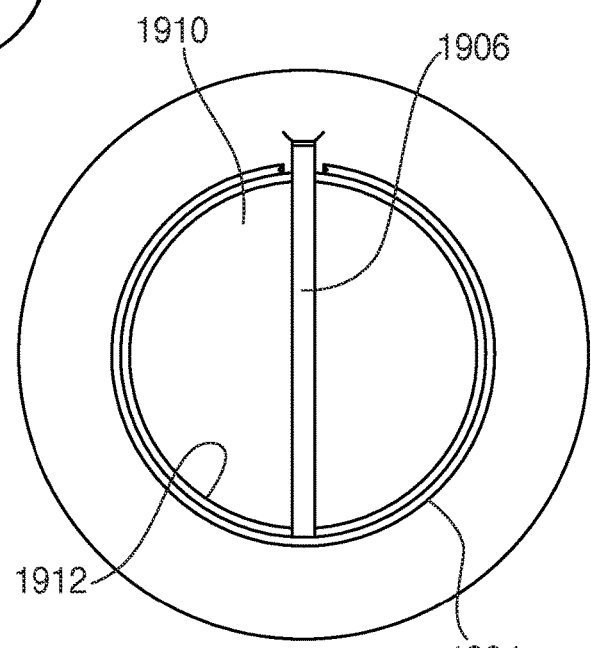
FIGS. 19B-19C are illustrated elevation views showing, respectively, top and side views of the holder for fishing tip up devices of FIG. 19A constructed in accordance with at least some of the embodiments disclosed herein.
Figure 19C:
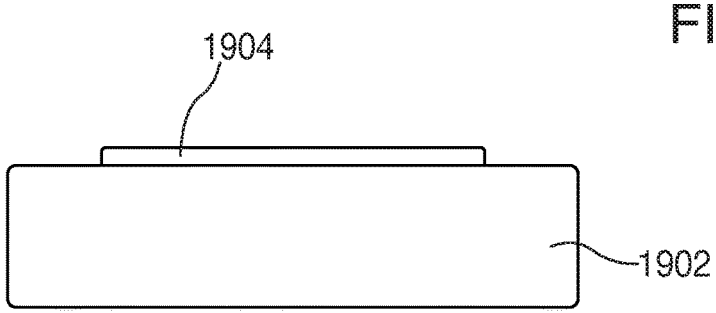

FIGS. 19A-19C show various views of another embodiment that utilizes the principles disclosed herein in fishing tip up device 1900. Similar to holder 1800, tip up device 1900 enables people fishing to utilize a product that was originally intended for one type of fishing, in this case ice fishing, to another type of fishing—free-flowing water fishing. Tip up devices are conventionally used by people ice fishing, in part because the fish are slower moving and slower reacting. Tip up devices have not been used in traditional fishing because there is not way to secure the device so that it remains parallel to the water.

Tip up device 1900, which includes out ring surface 1902, upper support ring 1904, cross-bar 1906 which is supported by lower support ring 1912, tip up release channel 1908 and pass through channel 1910, can be used in water because device 1900 is formed of EPS foam that has been encapsulated in polymer coating rendering device 1900 extremely buoyant and water-resistant. The ring-link structure of device 1900 enables it to remain stable on moving water, such that when a fish grabs the line, the structure of device 1900 supports the tip up and the tip up and be raised out of channel 1908 to stand straight up, thereby informing the person fishing that they need to reel in the catch.

The various embodiments described herein may be implemented using a variety of means, without limitation. Furthermore, the above-described embodiments are presented for the purposes of illustration are not to be construed as limitations.

What is claimed is:

1. A hunting sled comprising:
   a base structure comprising at least one piece of expanded polystyrene (EPS) foam, the at least one piece of EPS foam being encapsulated with a polymer coating, the base structure comprising:
   a substantially planer top surface having a front region, a center region, and a rear region;
   a front portion located in the front region of additional EPS foam extending below the bottom of the EPS foam in the center region of the planer top surface, the additional EPS foam providing additional buoyancy to the front region as compared to the center and rear regions; and
   a raised structure formed extending above the planar top surface, the raised structure being attached along the leading edge of the substantially planer top surface prior to the base structure being encapsulated with polymer coating, such that the raised structure is coated with the polymer coating.

2. The hunting sled of claim 1, wherein the EPS foam forming the front portion is bow-shaped to improve movement of the sled through water.

3. The hunting sled of claim 1, wherein the raised structure extends around and is attached to the periphery of the substantially planer top surface.

4. The hunting sled of claim 3, wherein the rear region of the substantially planer surface includes a rear indentation portion such that the sled can be nestled against and aligned with an object that is generally post-shaped.

5. The hunting sled of claim 4, wherein the raised structure includes at least one drain hole extending entirely through raised structure, the at least one drain hole being located in close proximity to the rear indentation portion.

6. The hunting sled of claim 1, wherein the rear region of the substantially planer surface includes a rear indentation portion such that the sled can be nestled against and aligned with an object that is generally post-shaped.

7. The hunting sled of claim 6, further comprising:
   at least one anchor fixed to an exterior surface of the rear region, the exterior surface being a surface that is orthogonal to the substantially planar top surface.

8. The hunting sled of claim 7, wherein the at least one anchor is fixed to the exterior surface of the rear region prior to the base structure being coated with the polymer coating such that the anchor is coated with the polymer coating.

9. The hunting sled of claim 6, further comprising:
   reinforcing material fixed to an exterior surface of the rear region, the exterior surface being a surface that is orthogonal to the substantially planer top surface; and
   at least one anchor fixed to the reinforcing material.

10. The hunting sled of claim 9, wherein the reinforcing material is fixed to the exterior surface of the rear region prior to the base structure being coated with the polymer coating such that the reinforcing material is coated with the polymer coating.

11. The hunting sled of claim 1, further comprising:
    at least one anchor fixed to an exterior surface of the front region, the exterior surface being a surface that is orthogonal to the substantially planer top surface.

12. The hunting sled of claim 11, wherein the at least one anchor is fixed to the exterior surface of the front region prior to the base structure being coated with the polymer coating such that the anchor is coated with the polymer coating.

13. The hunting sled of claim 11, further comprising:
    reinforcing material fixed to an exterior surface of the front region, the exterior surface being a surface that is orthogonal to the substantially planer top surface; and
    at least one anchor fixed to the reinforcing material.

14. The hunting sled of claim 13, wherein the reinforcing material is fixed to the exterior surface of the front region prior to the base structure being coated with the polymer coating such that the reinforcing material is coated with the polymer coating.

* * * * *